United States Patent
Bae et al.

(10) Patent No.: US 10,834,744 B2
(45) Date of Patent: Nov. 10, 2020

(54) METHOD AND APPARATUS FOR PERFORMING UPLINK TRANSMISSION IN A WIRELESS COMMUNICATION SYSTEM

(71) Applicant: LG Electronics Inc., Seoul (KR)

(72) Inventors: Duckhyun Bae, Seoul (KR); Yunjung Yi, Seoul (KR); Daesung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/064,408

(22) PCT Filed: May 18, 2018

(86) PCT No.: PCT/KR2018/005750
§ 371 (c)(1),
(2) Date: Jan. 9, 2019

(87) PCT Pub. No.: WO2018/212628
PCT Pub. Date: Nov. 22, 2018

(65) Prior Publication Data
US 2020/0146032 A1    May 7, 2020

Related U.S. Application Data

(60) Provisional application No. 62/617,087, filed on Jan. 12, 2018, provisional application No. 62/559,611, (Continued)

(51) Int. Cl.
*H04W 72/12* (2009.01)
*H04L 1/16* (2006.01)
(Continued)

(52) U.S. Cl.
CPC ....... *H04W 72/1268* (2013.01); *H04L 1/1642* (2013.01); *H04L 1/1819* (2013.01);
(Continued)

(58) Field of Classification Search
CPC ......... H04W 72/1268; H04W 72/0446; H04W 72/14; H04W 72/042; H04W 80/08;
(Continued)

(56) References Cited

U.S. PATENT DOCUMENTS

2012/0294269 A1   11/2012   Yamada et al.
2014/0254544 A1   9/2014    Au et al.
(Continued)

FOREIGN PATENT DOCUMENTS

JP    2016-514416      5/2016
KR    1020160037066 A  4/2016
(Continued)

OTHER PUBLICATIONS

Extended European Search Report in European Application No. 18801685.1, dated Jan. 22, 2020, 12 pages.
(Continued)

*Primary Examiner* — Thai Nguyen
(74) *Attorney, Agent, or Firm* — Fish & Richardson P.C.

(57) ABSTRACT

Disclosed are a method for performing uplink transmission in a wireless communication system and an apparatus therefor.
Specifically, a method for performing uplink transmission in a wireless communication system, which is performed by a user equipment includes: receiving, from a base station, configuration information for performing uplink transmission without an uplink grant; and transmitting uplink data, to the base station, through at least one uplink resource configured based on the configuration information, in which the configuration information may be received through a higher layer signaling, and the configuration information may include information related to repetition transmission of the uplink data.

15 Claims, 6 Drawing Sheets

Related U.S. Application Data filed on Sep. 17, 2017, provisional application No. 62/556,491, filed on Sep. 10, 2017, provisional application No. 62/541,053, filed on Aug. 3, 2017, provisional application No. 62/536,994, filed on Jul. 26, 2017, provisional application No. 62/512,175, filed on May 29, 2017, provisional application No. 62/508,350, filed on May 18, 2017.

(51) Int. Cl.
| | |
|---|---|
| *H04L 1/18* | (2006.01) |
| *H04L 5/00* | (2006.01) |
| *H04L 5/10* | (2006.01) |
| *H04L 27/26* | (2006.01) |
| *H04W 72/04* | (2009.01) |
| *H04W 72/14* | (2009.01) |
| *H04W 80/08* | (2009.01) |

(52) U.S. Cl.
CPC .............. *H04L 5/0051* (2013.01); *H04L 5/10* (2013.01); *H04L 27/2607* (2013.01); *H04L 27/2636* (2013.01); *H04W 72/042* (2013.01); *H04W 72/0446* (2013.01); *H04W 72/14* (2013.01); *H04W 80/08* (2013.01)

(58) Field of Classification Search
CPC ....... H04L 5/0051; H04L 5/10; H04L 1/1642; H04L 1/1819; H04L 27/2607; H04L 27/2636
See application file for complete search history.

(56) References Cited

U.S. PATENT DOCUMENTS

| | | |
|---|---|---|
| 2016/0219627 A1 | 7/2016 | Au et al. |
| 2018/0288746 A1* | 10/2018 | Zhang .................. H04L 1/0031 |
| 2018/0323909 A1* | 11/2018 | Ying ..................... H04L 1/1812 |

FOREIGN PATENT DOCUMENTS

| | | |
|---|---|---|
| KR | 1020160102448 A | 8/2016 |
| KR | 101669710 B1 | 10/2016 |
| KR | 1020170017225 A | 2/2017 |
| KR | 1020170042830 A | 4/2017 |
| WO | 2017039564 A1 | 3/2017 |
| WO | WO2018144559 | 8/2018 |

OTHER PUBLICATIONS

Huawei, HiSilicon, "Support of URLLC in UL," R1-1700024, 3GPP TSG RAN WG1 NR Ad Hoc Meeting, Spokane, Washington, USA, dated Jan. 16-20, 2017, 16 pages, XP 051207566.

LG Electronics, "Summary of [89-22] Email discussion about UL data transmission without UL grant," R1-1710328, 3GPP TSG RAN WG1 Ad-Hoc#2, Qingdao, P.R. China, dated Jun. 27-30, 2017, 41 pages, XP 051305881.

Fujitsu, Discussions on HARQ for grant-free transmission, R1-1707258, 3GPP TSG RAN WG1 Meeting #89, Hangzhou, P.R. China May 15-19, 2017, 5 pages.

Huawei, HiSilicon, Grant-free transmission for UL URLLC, R1-1706919, 3GPP TSG RAN WG1 Meeting #89, Hangzhou, China, May 15-19, 2017, 7 pages.

Huawei, HiSilicon, UL DMRS design for data transmission, R1-1704237, 3GPP TSG RAN WG1 Meeting #88bis, Spokane, USA, Apr. 3-7, 2017, 4 pages.

Japanese Office Action in Japanese Appln. No. 2019-536024, dated Jun. 30, 2020, 11 pages (with English translation).

Panasonic, Discussion on uplink control channel for NR, R1-1609816, 3GPP TSG RAN WG1 Meeting #86bis, Lisbon, Portugal, Oct. 10-14, 2016, 3 pages.

* cited by examiner

[FIG. 1]
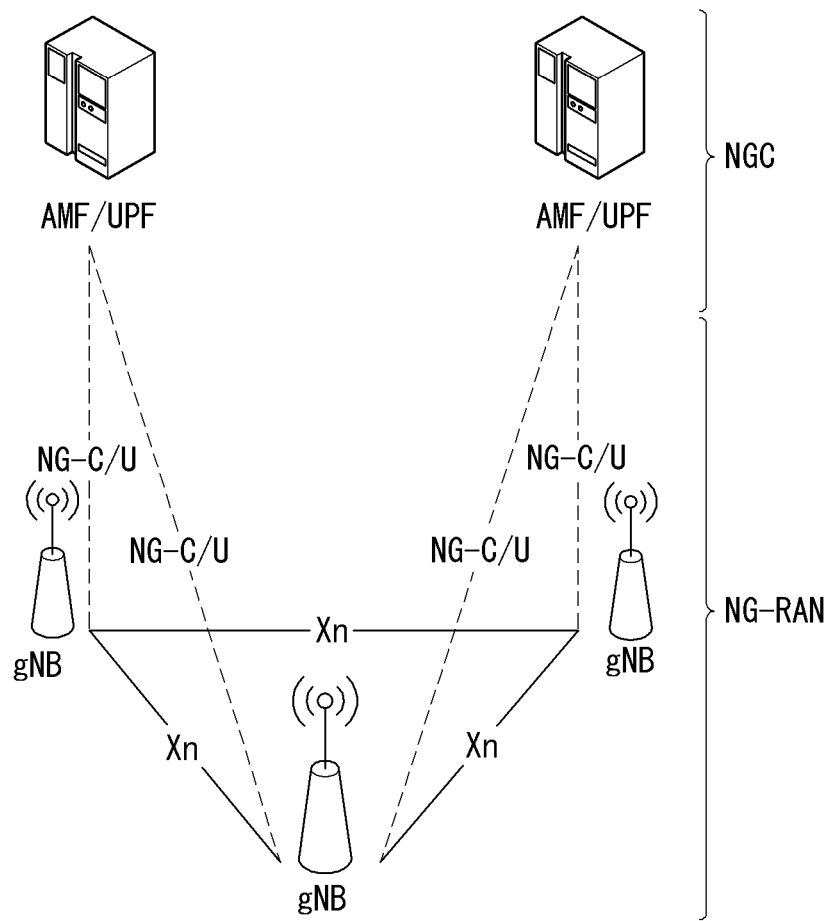
[FIG. 2]
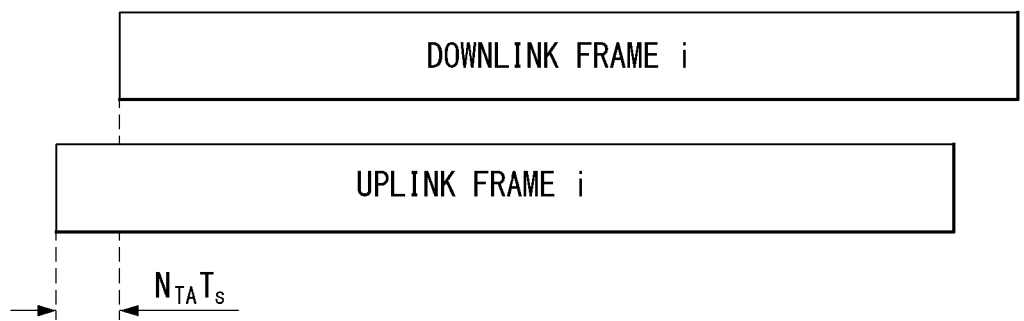

[FIG. 3]
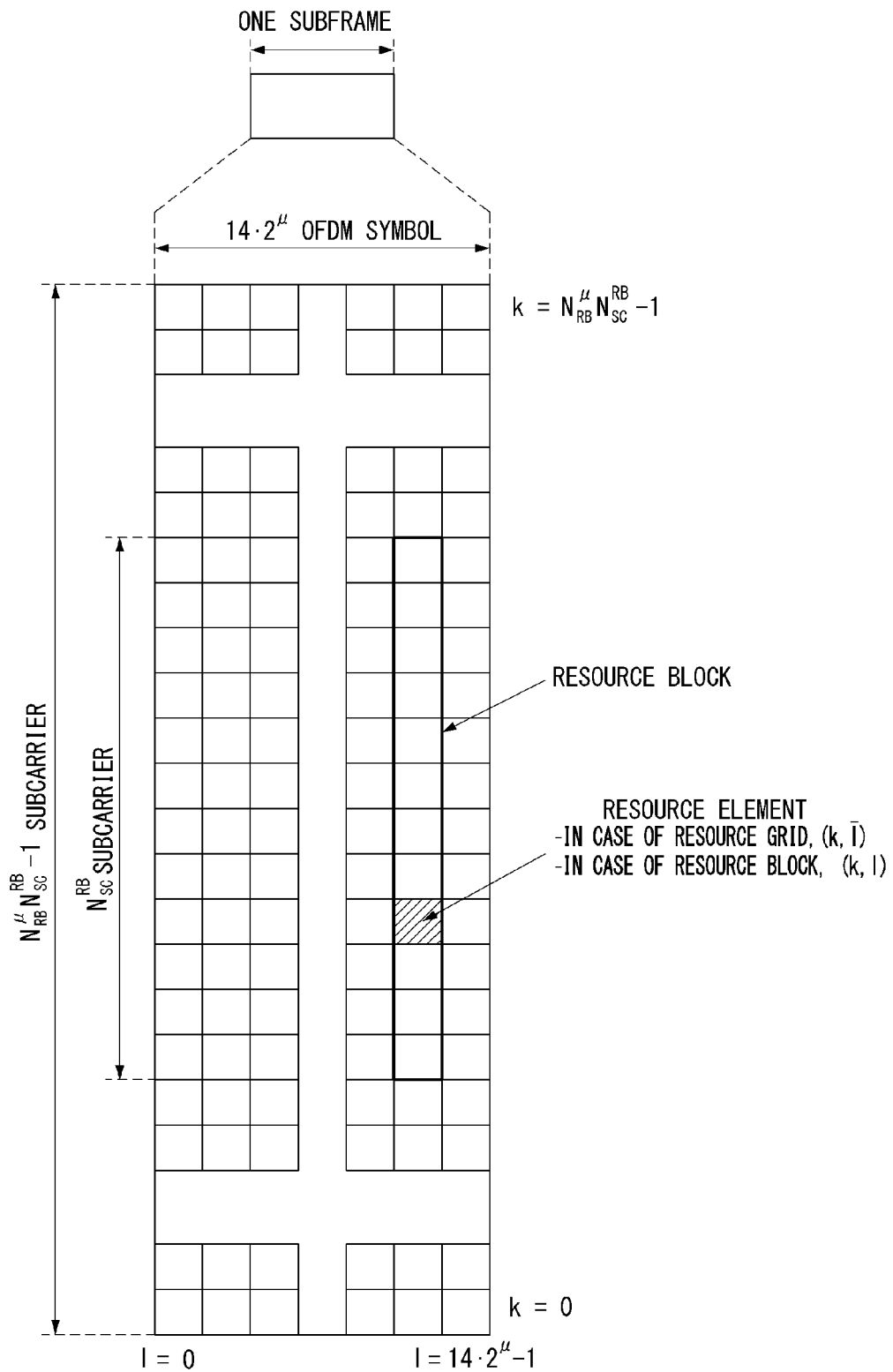

[FIG. 4]
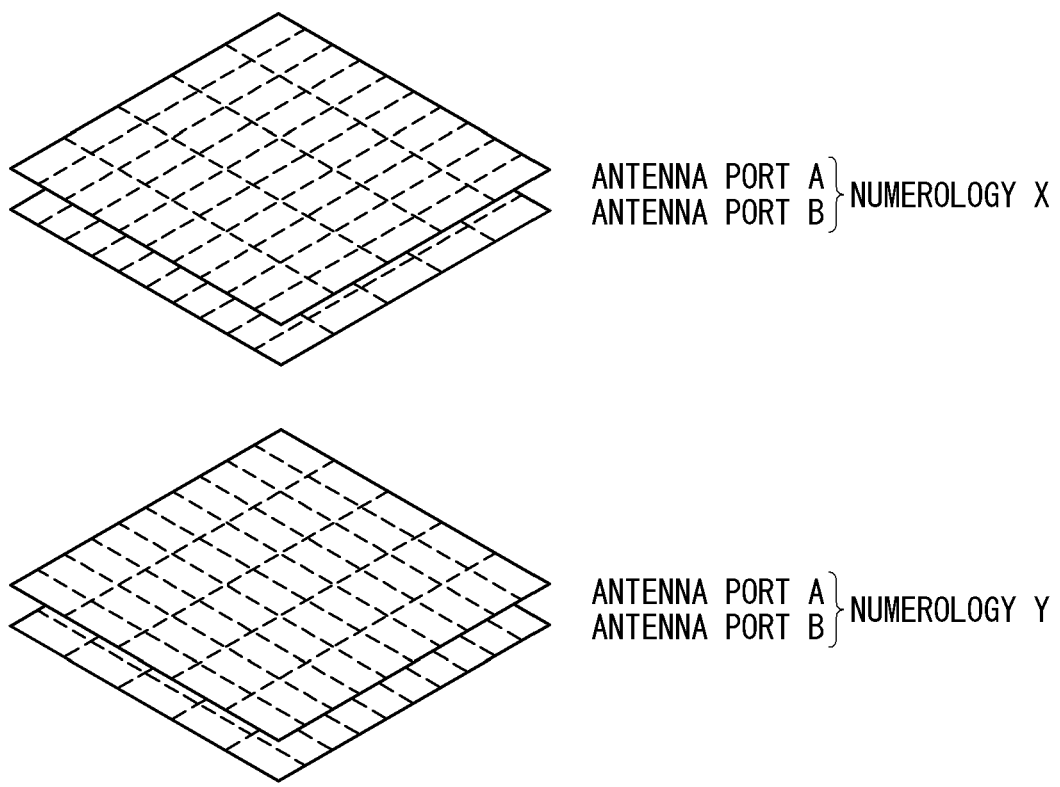

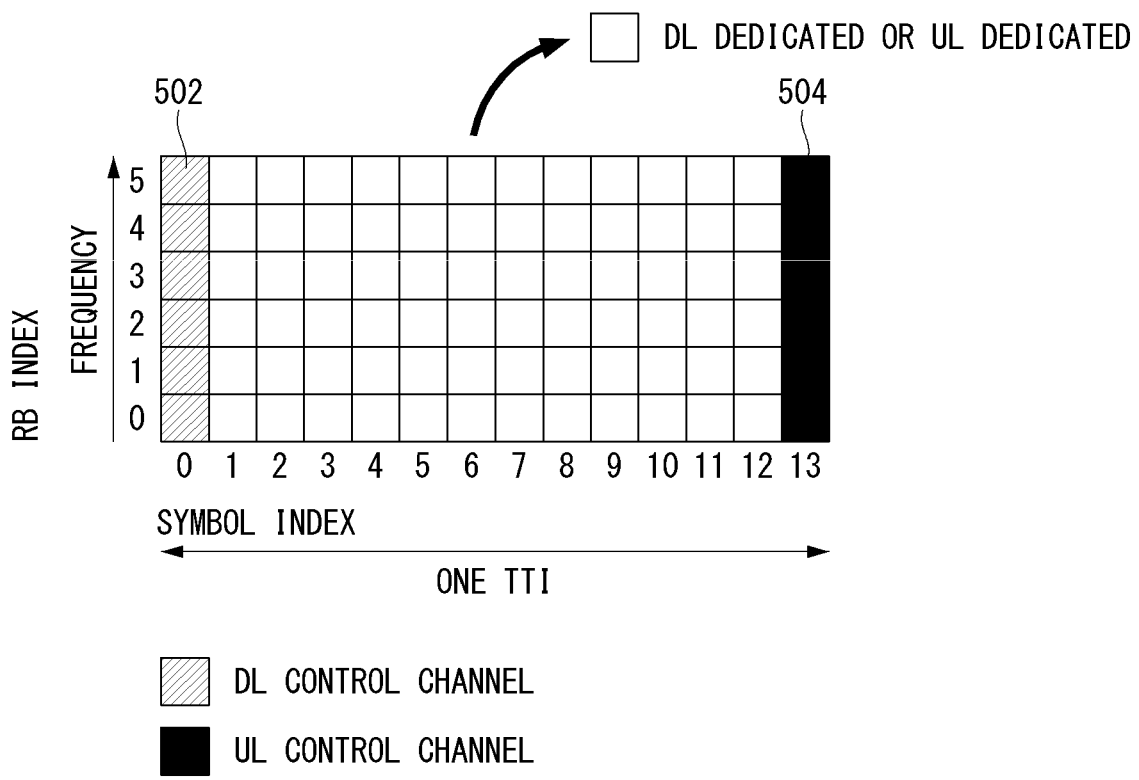
[FIG. 5]

[FIG. 6]
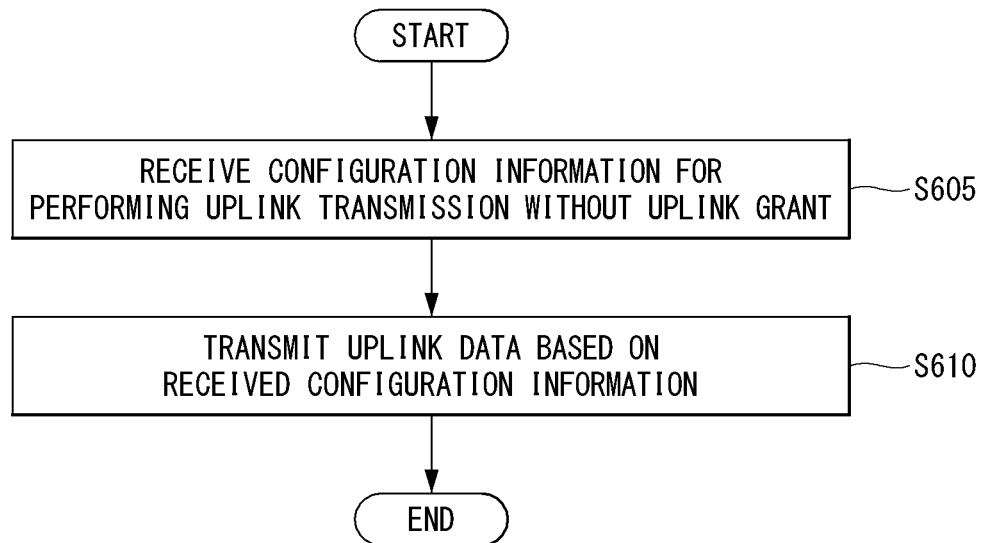
[FIG. 7]
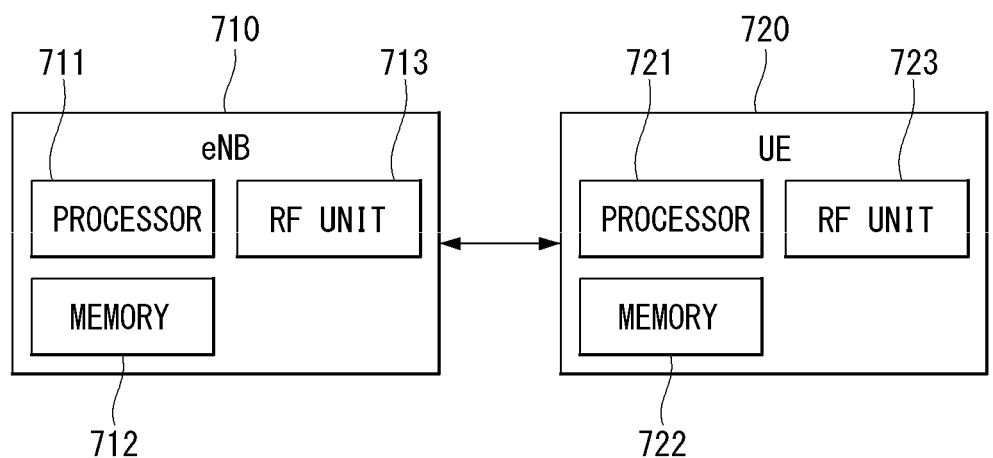

[FIG. 8]
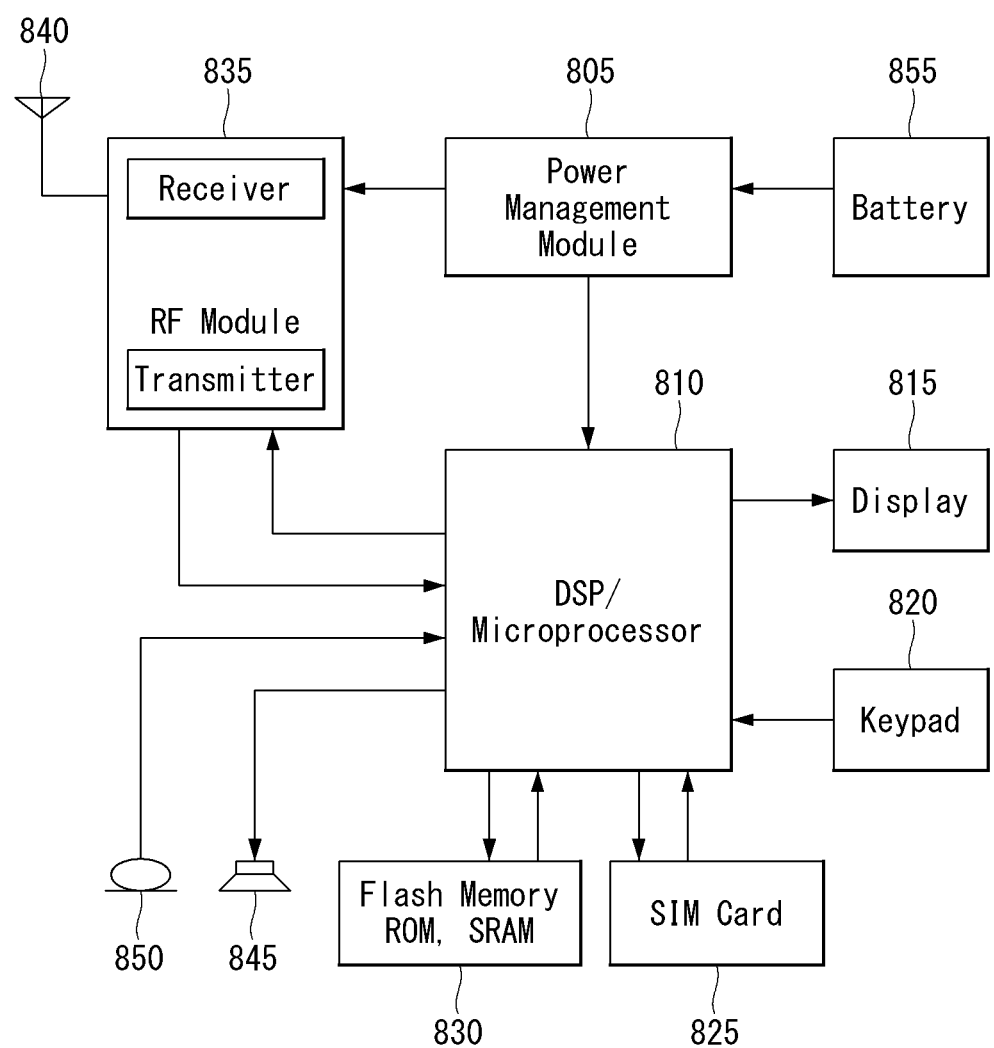

METHOD AND APPARATUS FOR PERFORMING UPLINK TRANSMISSION IN A WIRELESS COMMUNICATION SYSTEM

CROSS-REFERENCE TO RELATED APPLICATION

This application is the National Stage filing under 35 U.S.C. 371 of International Application No. PCT/KR2018/005750, filed on May 18, 2018, which claims the benefit of U.S. Provisional Application No. 62/508,350, filed on May 18, 2017, U.S. Provisional Application No. 62/512,175, filed on May 29, 2017, U.S. Provisional Application No. 62/536,994, filed on Jul. 26, 2017, U.S. Provisional Application No. 62/541,053, filed on Aug. 3, 2017, U.S. Provisional Application No. 62/556,491, filed on Sep. 10, 2017, U.S. Provisional Application No. 62/559,611, filed on Sep. 17, 2017, and U.S. Provisional Application No. 62/617,087, filed on Jan. 12, 2018.

The contents of which are all hereby incorporated by reference herein in their entirety.

TECHNICAL FIELD

The present invention relates to a wireless communication system, and more particularly, to a method for performing uplink transmission by a user equipment and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present invention provides a method for performing uplink transmission by a user equipment in a wireless communication system.

In particular, the present invention proposes a method for performing uplink transmission by the user equipment without dynamic scheduling (e.g., uplink grant) by a base station.

To this end, the present invention proposes a method for configuring configuration information delivered via higher layer signaling, etc., so that the user equipment may perform uplink transmission without dynamic scheduling by the base station, a method for acquiring the same, and an operating method of the user equipment when acquiring the same.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to an embodiment of the present invention, a method for performing uplink transmission in a wireless communication system, which is performed by a user equipment may include: receiving, from a base station, configuration information for performing uplink transmission without an uplink grant; and transmitting uplink data, to the base station, through at least one uplink resource configured based on the configuration information. Here, the configuration information may be received through a higher layer signaling, and the configuration information may include information related to repetition transmission of the uplink data.

Furthermore, in the method according to the embodiment of the present invention, the information related to the repeated transmission may include information indicating a repetition number of the uplink data. In this case, the configuration information may further include information regarding hopping related with transmission of the uplink data. Furthermore, the repetition number may be identically configured for slot based repetition transmission and non-slot based repetition transmission.

Furthermore, in the method according to the embodiment of the present invention, when the user equipment supports multiple waveform types for uplink transmission, the configuration information may further include information indicating a specific waveform type to be applied to transmission of the uplink data. For example, the specific waveform type may be based on any one of Cyclic Prefix-Orthogonal Frequency Division Multiplexing (CP-OFDM) or Discrete Fourier Transform-spread-Orthogonal Frequency Division Multiplexing (DFT-s-OFDM).

Further, the specific waveform type may be determined according to a resource allocation type included in the first configuration information. For example, when the at least one uplink resource is allocated contiguously, the specific waveform type may be a waveform type based on the DFT-s-OFDM, and when the at least one uplink resource is allocated non-contiguously, the specific waveform type may be a waveform type based on the CP-OFDM.

Furthermore, in the method according to the embodiment of the present invention, a Demodulation Reference Signal (DMRS) for the transmission of the uplink data may be differently configured for the multiple waveform types supported by the user equipment.

According to an embodiment of the present invention, a user equipment for performing uplink transmission in a wireless communication system may include: a Radio Frequency (RF) unit for transmitting and receiving a radio signal; and a processor functionally connected to the RF unit. The processor may control to receive, from a base station, configuration information for performing uplink transmission without an uplink grant, and transmit, to the base station, uplink data through at least one uplink resource configured based on the configuration information. Here, the configuration information may be received through a higher layer signaling, and the configuration information may include information related to repetition transmission of the uplink data.

Furthermore, in the user equipment according to the embodiment of the present invention, the information related to the repeated transmission may include information indicating a repetition number of the uplink data. In this case, the configuration information may further include information regarding hopping related with transmission of the uplink data.

Furthermore, in the user equipment according to the embodiment of the present invention, when the user equipment supports multiple waveform types for uplink transmission, the configuration information may further include information indicating a specific waveform type to be applied to transmission of the uplink data. For example, the specific waveform type may be based on any one of CP-OFDM or DFT-s-OFDM.

Furthermore, in the user equipment according to the embodiment of the present invention, a Demodulation Reference Signal (DMRS) for the transmission of the uplink data may be differently configured for the multiple waveform types supported by the user equipment.

Advantageous Effects

According to an embodiment of the present invention, there is an advantage in that a user equipment can perform uplink transmission even when the user equipment cannot receive or can omit dynamic scheduling (e.g., uplink grant, etc.) for the uplink transmission.

Further, according to an embodiment of the present invention, there is an advantage in that the user equipment can acquire information which is required for or helpful to the uplink transmission from a base station or autonomously derive the information even when the user equipment cannot receive or can omit the dynamic scheduling (e.g., uplink grant, etc.) for the uplink transmission.

In addition, according to an embodiment of the present invention, there is an advantage in that the user equipment can acquire information required for configuring multiple antenna ports even when using a transmission mode based on multiple antenna ports.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 illustrates an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example of a resource grid supported in a wireless communication system to which a method proposed by the present disclosure may be implemented.

FIG. 4 shows examples of resource grids for each antenna port and numerology to which a method proposed in this specification may be applied.

FIG. 5 illustrates an example of a self-contained structure in a wireless communication system to which the present disclosure may be implemented.

FIG. 6 illustrates an operation flowchart of a user equipment which performs uplink transmission in a wireless communication system to which a method proposed in this specification may be applied.

FIG. 7 illustrates a block diagram of a wireless communication device to which methods proposed in this specification may be applied.

FIG. 8 illustrates a block diagram of a communication device according to an embodiment of the present invention.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480\cdot 10^3$, and $N_f=4096$. DL and UL transmission is configured as a radio frame having a section of $T_f=(\Delta f_{max}N_f/100)\cdot T_s=0.10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $$n_s^\mu \in \{0, \ldots, N_{subframe}^{slots,\mu} - 1\}$$

in a subframe, and in ascending order of $$n_{s,f}^\mu \in \{0, \ldots, N_{frame}^{slots,\mu} - 1\}$$

in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | Slot configuration | | | |
|---|---|---|---|---|---|
| | | 0 | | | 1 |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | |
|---|---|---|---|---|---|
| | | 0 | | | 1 |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14.2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 shows examples of resource grids for each antenna port and numerology to which a method proposed in this specification may be applied.

Each element of the resource grid for the numerology μ and the antenna port p is indicated as a resource element, and may be uniquely identified by an index pair (k,Ī). Herein, $k=0, \ldots, N_{RB}^\mu N_{sc}^{RB}-1$ is an index in the frequency domain, and $Ī=0, \ldots, 2^\mu N_{symb}^{(\mu)}-1$ indicates a location of a symbol in a subframe. To indicate a resource element in a slot, the index pair (k,Ī) is used. Herein, $l=0, \ldots, N_{symb}^\mu-1$.

The resource element (k,Ī) for the numerology μ and the antenna port p corresponds to a complex value $a_{k,Ī}^{(p,\mu)}$. When there is no risk of confusion or when a specific antenna port or numerology is specified, the indexes p and μ may be dropped and thereby the complex value may become $a_{k,Ī}^{(p)}$ or $a_{k,Ī}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 5 illustrates one example of a self-contained structure to which the method proposed in this specification may be applied. FIG. 5 is just for convenience of the description and does not limit the scope of the present invention.

Referring to FIG. 5, it is assumed that one transmission unit (e.g., slot or subframe) is constituted by 14 orthogonal frequency division multiplexing (OFDM) symbols as in legacy LTE.

In FIG. 5, a region 502 refers to a downlink control region and a region 504 refers to an uplink control region. Further, a region (that is, a region without a separate indication) other than the regions 502 and 504 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 5 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 5, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

In the NR system, a method for performing the uplink transmission without receiving a grant (e.g., uplink grant or UL grant) when the UE performs the uplink transmission according to a service field (i.e., application field) or a type of traffic. In this case, the UE may perform the uplink transmission through a semi-persistently configured resource.

Such a transmission scheme can be referred to as a grant-free transmission scheme. In this case, the grant-free transmission scheme may be referred to as a configured-grant transmission scheme in view of a fact that configuration information such as resource allocation or the like is transmitted through higher layer signaling or the like.

That is, the grant-free transmission scheme mentioned in this specification may mean a scheme in which the UE performs the uplink transmission without receiving the grant (e.g., UL grant) from the base station (i.e., without the grant). In other words, the grant-free transmission scheme may mean a scheme in which the UE performs the uplink transmission based on semi-static scheduling rather than dynamic scheduling by the base station. In this case, the UE may be configured a resource for the uplink transmission in advance and the UE may perform the uplink transmission on the assumption that the grant exists for the configured resource.

Unlike this, the scheme in which the UE performs the uplink transmission based on the grant received from the base station may be referred to as the grant-based transmission scheme. Further, by considering that the grant-based transmission scheme is the uplink transmission by the dynamic scheduling, the grant-based transmission scheme may be referred to as uplink transmission (e.g., PUSCH transmission) scheduled by DCI.

In the case of the grant-free transmission scheme, a radio resource which different UEs share based on a contention or a radio resource dedicatedly allocated to the UE may be used.

In the NR system, a method may be considered, for applying a different modulation and/or coding scheme from the radio resource which is allocated through the uplink grant (i.e., grant-based transmission scheme) to the radio resource used in the grant-free transmission scheme. Further, a method may also be considered, for applying different transport block sizes (TBSs) and/or different time intervals (TTIs) to the grant-free transmission scheme and the grant-based transmission scheme.

In addition, the UE may be allocated one or more radio resources for the grant-free transmission scheme and in the case of multiple radio resources used for the grant-free transmission scheme, sizes, modulation and coding schemes, and time/frequency scheduling units may be set to be the same as or different (or overlapped with) from each other. Further, a method which the UE is configured to repeatedly attempt transmission of the same data (or traffic) in order to enhance a success rate of the grant-free transmission may also be considered.

As described above, in the NR system, the grant-free transmission scheme may be considered in which the UE performs the uplink transmission without scheduling (in particular, dynamic scheduling) of the base station. In such uplink transmission, in general, a method using a resource pool shared by multiple UEs based on the contention may be considered.

Like the uplink grant (UL grant) in the existing LTE system, information required for (or helpful to) the uplink transmission by the UE may be included in a dynamic uplink scheduling message of the base station. Accordingly, in order for the UE to perform the uplink transmission without scheduling (i.e., grant-free transmission scheme) of the base station, the UE needs to acquire the information included in the existing uplink scheduling message in a scheme which is different from the existing scheme.

In consideration of such a point, this specification proposes a method for acquiring the information required for the uplink transmission from the base station, which performs the uplink transmission without the dynamic scheduling (e.g., UL grant) of the base station and an operation of the UE acquiring the information by the method.

Further, the radio resource (or resource) in this specification may mean resources that are distinguished from each other according to according to a multiple access scheme, which include a spreading code, a scrambling code, an interleaving pattern, and power allocation as well as the time/frequency resource. In addition, feedback, ACK, or NACK in this specification is not limited to a result of a decoding result of data which is simply received and may include a response for transmission which the base station sends for successful uplink transmission.

Further, methods proposed in this specification are described with respect to an uplink channel (or signal) and the radio resource for the grant-free transmission scheme or grant-based transmission scheme, but are not limited thereto. That is, the methods proposed in this specification may be extensively applied even to a downlink channel (or signal) and a different radio resource.

Embodiments described below relate to methods in which the UE receives necessary information to support the grant-free transmission scheme. It is to be understood that the embodiments are just distinguished for easy description and some configurations or features of certain embodiments may be included in other embodiments or may be replaced with corresponding configurations or features of other embodiments. For example, the configuration of an embodiment (e.g., a second embodiment below) related to uplink repetition transmission and the configuration of an embodiment (e.g., a fourth embodiment) related to the waveform of the uplink transmission may be combined.

First Embodiment—Method for Acquiring Information Related to Transmission Mode Using Multi-Antenna Ports In the NR system, for efficient transmission, a method of using multiple antennas in the uplink transmission using the grant-free transmission scheme may be considered. In this case, two or more transport blocks may be used for the uplink transmission.

First, in the existing LTE system, the following information may be included in the uplink grant (hereinafter, referred to as UL grant) for the UE using multiple antennas.

Modulation and coding scheme (MCS) and redundancy version (RV) for two transport blocks
New data indicator (NDI) for two transport blocks
Precoding information and number of layers In this case, regarding the MCS, the RV, and/or the NDI information, the UE may be configured to dividedly acquire the same MCS, RV, and NDI information as a case of using one antenna twice or to acquire the MCS, the RV, and the NDI information for two transport blocks once. Alternatively, for a second transport block, the MCS, the RV, and the NDI information of a first transport block may be reused. Alternatively, a value acquired by applying an offset to the information for the first transport block by a predetermined value or rule may be used for the second transport block. Alternatively, it may be assumed that when the resource and the MCS are allocated by the dynamic signaling (e.g., DCI), the UE regards only a case where two transport blocks may be configured as the DCI as a case where two transport blocks are transmitted and regards other cases as a case where only one transport block is transmitted. Alternatively, a method for configuring only a single transport block to be used may also be considered in the case of the grant-free transmission scheme.

Further, regarding the precoding information and the number of layers, the information may include information on the number of layers to be used by the terminal and a precoding matrix to be used for transmission by the UE. Such information may affect uplink transmission performance of the UE according to a channel status of the UE and a rank of the UE.

Considering the grant-free transmission scheme proposed in the present invention, the following methods (hereinafter, methods 1 to 4) may be considered in order for the UE to acquire the aforementioned information.

Method 1)

First, a method for acquiring the aforementioned information through the higher layer signaling from the base station by the UE may be considered.

In this case, the information may be configured based on a sounding reference signal (SRS), channel state information (CSI), and the like, which are last transmitted by the UE. Alternatively, the information may be configured to use the lowest number of layers and/or a codebook index that is different from other terminals sharing the PUSCH resource being used. Here, sharing the PUSCH resource may mean that the resource is configured through a common RRC configuration.

Method 2)

Further, a method for acquiring the aforementioned information through Layer 1 signaling (L1 signaling) by the UE may be considered. Here, the L1 signaling may mean signaling in the physical layer.

In this case, the UE may select to wait for the L1 signaling for using a multi-antenna transmission mode. The L1 signaling may be performed (or transmitted) by the base station by the uplink transmission of the UE, such as the CSI, SRS, DMRS, and PUSCH transmissions of the UE (or arbitrarily).

Method 3)

Further, a method may be considered in which the UE is configured to derive the information from any downlink transmission or acquire the information without any other feedback.

Here, the downlink transmission and/or feedback may be information associated with the higher layer signaling of the base station, an L1 signaling reference signal, or previously performed PDSCH reception. For example, the UE may be configure to an open-loop MIMO scheme for the grant-free transmission.

Method 4)

In addition, a method may be considered in which the network may give (that is, configure) multiple resource in which the MCS, the number of layers, a transmission technique, and the like are differently configured to the UE and configures a threshold which may be used for each resource set, etc. together. As an example, the network may configure multiple resource sets in which the MCS is differently configured and each resource set may be configured selectable thresholds together.

In this case, the UE may select the resource set according to a radio resource management (RRM) value, L1-reference signal received power (L1-RSRP), or the threshold. Alternatively, the resource may be selected according to a wideband channel quality indicator (CQI) value or a subband CQI value. Here, the wideband CQI may be measured by assuming a bandwidth of a resource to be transmitted by the UE as the wideband.

The resource selected by the UE may be delivered to the network via CSI feedback, delivered to the network via reporting of the RRM value, or fed back via another channel.

Based on the resource(s) selected by the UE, the UE may perform resource adaptation operations including a collision probability, resource sharing in the grant-based transmission scheme, and so on.

As an example of the threshold, RRM, L1-RSRP, wideband QCI, subband QCI, and the like may be considered. Alternatively, a separate measurement for threshold setting may be performed. Alternatively, the threshold may be based on a Radio Link Measurement (RLM) result or the like or may be based on a Signal-to-Interference-plus-Noise Ratio (SINR). Alternatively, the MCS or the like may be dynamically changed by the measurement of the UE in the determined resource set and a set of the values of the available MCS and/or TBS and the threshold of measurement may be configured.

The selection as described above may be applied differently for initial transmission and retransmission. When the initial transmission and the retransmission are differently selected, it may be assumed that the same HARQ identifier (HARQ ID) may be used or only one grant-free resource may be configured per each carrier in the case of one UE. Therefore, it may be assumed that the same transport block is used even though other resources and MCS are used. Alternatively, the MCS value selected in the initial transmission may be applied at the same time during retransmission or the retransmission resources of other MCSs may be configured separately.

The base station may be configured so that the UE uses method 3 or 4 through methods 1 and 2 described above. Alternatively, the UE may use some of information acquired through methods 1 and 2 together in using method 3.

Further, when the UE uses method 3, when the information acquired through methods 1 and 2 is insufficient, and/or when the UE needs to determine that the acquired information needs to be changed, the UE may be configured to change randomly acquired information. In this case, the base station may configure (or designate) a range in which the UE may randomly change the information in advance and the UE may perform blind decoding in a configured region. Alternatively, when the UE randomly changes the information, the UE may be configured to deliver the changed information by using separate uplink control information (UCI) and/or an indicator.

Second Embodiment—Method for Acquiring Information Related to Repetition Transmission As mentioned above, a method may be considered, for repeatedly performing transmission of the same data (or traffic) several times in order to enhance the success rate of the transmission.

However, in the case of such repetition transmission, the scheduling of the base station for each transmission or the response of the UE to each transmission may be avoided in terms of radio resources and power efficiency. With reference to such a point, a method of recycling information used for initial transmission by the UE for the repetition transmission may be considered.

In this case, the following information (or parameter or information element) may be additionally considered. Each information may be UE-specifically configured or group or cell-specifically configured.

Number of repetitions

Method and index for hopping between repetitions

Here, the method for the hopping between the repetitions and information on the index may mean information on a hopping pattern.

Considering the grant-free transmission scheme proposed in the present invention, the following methods (hereinafter, methods 1 to 3) may be considered in order for the UE to acquire the aforementioned information.

Method 1)

First, a method of using a preset value for the information may be considered.

For example, the UE and the base station using the same radio access technology (RAT) may be configured to use a predetermined number of repetitions and a predetermined hopping pattern without a separate configuration in the grant-free transmission scheme.

Method 2)

Further, the information may be configured via the higher layer signaling.

That is, in performing the grant-free transmission scheme, the UE may receive configuration information for the number of repetitions (i.e., the number of repetition transmissions) and/or the hopping pattern from the base station via the higher layer signaling. In this case, the configuration information for the number of repetitions and/or the hopping pattern is for the grant-free transmission scheme and may be configured separately from the configuration information for the grant-based transmission scheme.

Here, the value indicating (or representing) the number of repetitions may be referred to as 'repetition K' or 'repK'. Further, the value indicating the number of repetitions may mean the number of resources which the base station sets to perform the repetition transmission with respect to the UE. In this case, the UE may be configured to perform repetition transmissions of a number which is equal to the value indicating the number of repetitions or smaller therethan.

Transmission of the configuration information for the number of repetitions and/or the hopping pattern through the higher layer signaling may be performed before or after the repetition transmission.

Method 3)

Further, the information may be dynamically configured through the L1 signaling. Transmission of the configuration information for the number of repetitions and/or the hopping pattern through the L1 signaling may be performed not only before or after the repetition transmission but also during the repetition transmission.

The UE may acquire the information using one or more methods of the methods described above. For example, when methods 1 and 3 are used, the UE which may not acquire the information by method 3 may use the information acquired through method 1. Alternatively, when all of methods 1 to 3 are used, the information acquired through method 1 or 2 may be changed through method 3.

Alternatively, when multiple methods are used in combination, a method for specifying a use range of information, that is, parameter values, may also be considered. For example, the parameter value set by method 3 may be set to be applied only to immediately next transmission. Alternatively, the UE may be configured to use a parameter configured until a separate timer or counter expires and use a basic value of the parameter allocated through method 1 or 2 when the timer or counter expires.

At this time, with respect to the setting of the number of repetitions among the aforementioned information, the operations of the UE according to a setting time point may be the same as the following examples. That is, the operation of performing the current or subsequent transmission may be different depending on a time when the UE receives the configuration for the new number of repetition transmissions.

For example, when the number of repetitions is configured (or set) before the transmission time, the UE may be configured to apply the set value to the next transmission.

As another example, when the number of repetitions (i.e., a new number of repetitions, K') is configured during the repetition transmission, the UE may be configured to stop the current transmission and apply the corresponding configured value to the next transmission.

As yet another example, when the number of repetitions (i.e., the new number of repetitions, K') is set during the repetition transmission, the UE may be configured to maintain transmission without applying a new setting to the current transmission and apply the new configuration from the next transmission.

As still yet another example, when the number of repetitions (i.e., a new number of repetitions, K') is set during the repetition transmission, the UE may be configured to stop the current transmission and apply the corresponding configured value to the next transmission. Thereafter, the UE may continuously use the K' value for the next transmission or may use the previously configured repetition number K value again.

As still yet another example, when the number of repetitions (i.e., a new number of repetitions, K') is configured during the repetition transmission, the UE may be configured to stop or start transmission again by comparing the configured value and the previous value. Specifically, when the value of K' is greater than the previous value K, the UE may extend the number of repetitions currently being transmitted to K' or may perform repetition transmissions as many as K'. Unlike this, when the K' value is smaller than K, the UE may be configured to stop the current transmission and apply the K' value to the next transmission.

As still yet another example, when the number of repetitions (i.e., the new number of repetitions, K') is configured after the repetition transmission, the UE may be configured to perform additional repetition transmissions which is as many as the new configured K' value. Thereafter, the UE may continuously use the K' value for the next transmission or may use the previously configured repetition number K value again.

As still yet another example, when the number of repetitions (i.e., the new number of repetitions, K') is configured after the repetition transmission, the UE may operate similarly to the case where the number of repetitions is configured before the transmission time.

As still yet another example, the UE may be configured to stop the transmission stops regardless of the transmission time of the configuration information for the number of repetitions and apply the configured value to the next transmission. In this case, the next transmission may not be performed until another signaling is received.

The operations of the aforementioned examples may be determined according to what signaling the setting (i.e., repetition configuration) of the number of repetitions received by the UE is transmitted. As an example, in the case of setting through L1 signaling after the transmission, the operation of a sixth example may be used and in the case of setting through the higher layer signaling, the operation of a seventh example may be used. Further, even in the same L1 signaling, the operations of different examples may be selected according to whether the signaling is UE-specific, cell-specific, group, or resource-specific.

Further, the method for the hopping between the repetitions and the index information or the information for the resource configuration for the grant-free transmission among the aforementioned information may be transmitted through the dynamic signaling (e.g., DCI) during the repetition transmission. In this case, the UE may operate according to one of three methods (hereinafter, referred to as methods 1 to 3) to be described below.

Method 1)

The UE may be configured to stop the uplink transmission which is currently transmitted. Alternatively, the UE may be configured to maintain the existing configuration for the uplink transmissions which is currently transmitted and apply the new configuration from the next transmission (i.e., postpone the application of the new setting).

Method 2)

The UE may be configured to halt the uplink transmission which is currently transmitted and resume transmission in a changed grant-free resource through the signaling. In this case, in order to resume the transmission in the changed grant-free resource, the separate L1 signaling may be required.

Method 3)

The UE may be configured to halt the uplink transmission which is currently transmitted and resume transmission in a changed grant-free resource through the signaling and newly restart the same transmission in the changed grant-free resource through the signaling.

In this case, even in the case of the grant-based transmission scheme, the number of repetitions may be configured via the higher layer signaling like the case of the grant-free transmission scheme. In this case, the number of repetitions may be configured by the following schemes.

A slot-based transmission scheme mentioned below may refer to a scheme in which the transmission is performed according to a slot structure and a non-slot-based transmission scheme may refer to a scheme in which the transmission is performed regardless of the slot structure. Further, slot-based scheduling may refer to scheduling the resource or the like according to the slot structure and non-slot-based scheduling may refer to scheduling the resource or the like regardless of the slot structure.

With respect to the configuration for the number of repetitions, one value may be configured for each carrier. In this case, the same value may be applied to each carrier regardless of the grant-based transmission scheme, the grant-free transmission scheme, the slot-based transmission scheme, and the non-slot-based transmission scheme. Such a configuration may be separately made in the PUCCH and/or PUSCH and separately configured in the PUSCH without the UCI and the PUSCH with the UCI.

With respect to the setting for the number of repetitions, the number of repetitions may be configured separately for Type ½ and the grant-based transmission scheme for each carrier. In this case, the same value may be applied to each carrier regardless of the slot-based transmission scheme and the non-slot-based transmission scheme. Such a configuration may be separately made in the PUCCH and/or PUSCH and separately configured in the PUSCH without the UCI and the PUSCH with the UCI. In this case, it may be assumed that in the case of the retransmission by the grant-free transmission scheme, the grant-based transmission scheme is adopted or in the case of the grant-based transmission scheme, when the retransmission is the grant-free transmission scheme, the number of repetitions of the grant-free transmission scheme is adopted.

With respect to the setting for the number of repetitions, the number of repetitions may be configured separately for Type ½ and the grant-based transmission scheme for each carrier. In this case, it may be assumed that different values may be configured with respect to the slot-based transmission scheme and the non-slot-based transmission scheme. Such a configuration may be separately made in the PUCCH and/or PUSCH and separately configured in the PUSCH without the UCI and the PUSCH with the UCI.

Each repetition transmission may be configuration together in the resource configuration on the time domain. This case may mean that a different repetition value is configured according to a resource entry in the selected time domain (e.g., a row index value in a resource allocation table in the time domain set through the higher layer signaling). This may be efficient when the UE supports multiple block error rates (BLERs). Alternatively, it may be assumed that multiple resource tables on the time domain may be configured for each BLER and the table may be dynamically selected first, and the same number of repetitions is applied in the selected table.

When the number of repetitions is set with respect to the slot-based scheduling scheme, each repetition transmission may be automatically determined according to the resource configuration on the time domain or may be selected as one of given values. For example, when the number of repetitions, K is set with respect to the slot-based scheduling, the number of repetitions for the non-slot-based scheduling may be configured to a fraction or a multiple of K. As another example, when two or more repetition transmission (the numbers of repetitions, K1 and K2) may be configured, K1 may be configured with respect to the slot-based scheduling and K2 may be configured with respect to the non-slot-based scheduling.

Further, the setting for the number of repetitions described above may be configured even in the uplink transmission or downlink transmission related with an initial procedure of the UE.

For example, Msg3 may also be repeatedly transmitted and the value for the number of repetitions may be set differently according to the RSSI or RSRP value of the UE. The repetition transmission (i.e., the number of repetitions) may be configured differently according to the selected PRACH format. Alternatively, the number of repetitions may be set differently for each RACH resource. Further, multiple slots may be configured even in the PUCCH for HARQ feedback for Msg4. Here, the multi-slot configuration may mean scheduling the resource or the like over multiple slots regardless of a boundary of the slot. Such a value may be determined in link with a retransmission with Msg3 or separately set or dynamically indicated.

Third Embodiment—Method for Acquiring UE-Specific Information in Cell/Group/Resource-Specific Signaling The information (or parameter) used by the terminal for transmission may be distinguished by the UE-specific information (or UE-specific parameter) and the cell/group/resource-specific information (or cell/group/resource-specific parameter). Further, the signaling for delivering such information may also be distinguished into UE-specific signaling and cell/group/resource-specific signaling.

It may be preferentially considered that the UE-specific parameter is transmitted through the UE-specific signaling and the cell/group/resource-specific parameter is transmitted through the cell/group/resource-specific signaling. In this case, in terms of reducing signaling overhead, a method for delivering the cell/group/resource-specific parameter through the UE-specific signaling may be considered.

To this end, the base station may encapsulate the same cell/group/resource-specific parameter in the message delivered through each UE-specific signaling. However, when the UE-specific parameter is delivered using the cell/group/resource-specific parameter, each UE may need to derive the parameter (i.e., parameters set differently for each UE) thereof from the same value. In this case, a method for deriving each parameter may be differently configured.

In the embodiment, methods are described based on division of 'UE-specific parameter or signaling' and 'cell/group/resource-specific parameter or signaling', but this may be similarly applied even to cases of 'any cell/group/resource-specific parameter or signaling' and a 'subset parameter or signaling therefor'. For example, the UE of each group may derive group-specific information from the cell-specific parameter. Alternatively, when a UE group uses multiple resources or resource sets, the UE group may derive the resource-specific parameter through the group-specific signaling.

Further, when the grant-free transmission scheme is considered, each UE needs to have different values for a parameter (hereinafter, referred to as RS parameter) for a reference signal. Specifically, considering the grant-free transmission scheme, each UE may share information such as the uplink resource, the MCS, or the like group-specifically, but for some parameters such as the RS parameter, each UE may be configured to have a different value.

In this case, each UE may acquire a seed value of the RS parameter through group common signaling or the like and acquire the index of the RS parameter by using a unique value (e.g., a UE identifier (UE-ID)) of each UE. To this end, the RS parameter may include information indicating a size (e.g., the number of UEs) of the UE group and the size of the UE group, which is determined at the time of generating the group may be set to be used when the RS parameter is acquired.

Fourth Embodiment—Method for Acquiring Information on Waveform Type

In the NR system, the UE is configured to support multiple waveform patterns, and as a result, a method for changing a waveform pattern which the UE uses for transmission (or indicating the waveform pattern to be used) through (or via) the L1 signaling such as a cell configuration, the higher layer signaling, and/or the dynamic signaling of the base station may be considered.

In this case, even when the UE performs the uplink transmission based on the grant-free transmission scheme, the waveform pattern to be used by the UE may be determined by considering a capability of the UE or multiplexing performance of the resource (hereinafter, referred to as a grant-free resource) configured for the grant-free transmission scheme.

For example, for multiplexing, the base station may be configured to use a Discrete Fourier Transform-spread-Orthogonal Frequency Division Multiplexing (DFT-s-OFDM) based waveform pattern. Here, the DFT-s-OFDM based waveform pattern may refer to a waveform pattern using a Zadoff-Chu (ZC) sequence as the reference signal. Further, the DFT-s-OFDM based waveform pattern may refer to a case where a transform precoding operation is applied in the uplink transmission. That is, a fact that a transform precoder is enabled may mean that the DFT-s-OFDM based waveform pattern is used for the transmission.

As another example, a peak to average power ratio (PAPR) may be supervised for flexibility and a channel and the base station may be configured to use a Cyclic Prefix-Orthogonal Frequency Division Multiplexing (CP-OFDM) based waveform pattern with respect to the UE. Here, the CP-OFDM based waveform pattern may refer to a waveform pattern using a Pseudo-random Noise (PN) sequence as the reference signal. Further, the CP-OFDM based waveform pattern may refer to a case where the transform precoding operation is not applied in the uplink transmission. That is, a fact that the transform precoder is disabled may mean that the CP-OFDM based waveform pattern is used for the transmission.

Alternatively, a method for randomly determining the waveform pattern to be used for transmission by the UE may also be considered.

In this case, in order to change (or apply) the waveform pattern to be used for transmission by the UE that uses the grant-free transmission scheme, the following methods (hereinafter, methods 1 to 5) may be considered.

Method 1)

A method may be considered, in which the base station determines the waveform pattern which the UE is to use through (or via) the higher layer signaling (e.g., RRC signaling). That is, the base station may be configured to deliver configuration information including information indicating the waveform pattern to be used for the uplink transmission to the UE through the higher layer signaling.

In this case, the configuration information delivered through the higher layer signaling may include information explicitly indicating the waveform pattern or information indicating the waveform pattern. As mentioned above, the information implicitly indicating the waveform pattern may correspond to information indicating whether the transform precoder is enabled or disabled.

Further, such configuration information may be configured for the grant-free transmission scheme separately from the configuration information for the grant-based transmission scheme. In addition, the higher layer signaling may be performed simultaneously when the UE is configured (or allocated) the grant-free resource or may be changed through signaling separate from the grant-free resource.

Method 2)

A method may also be considered, in which the base station determines the waveform pattern to be used by the UE through the L1 signaling.

As an example, when the UE is allocated the grant-free resource through the L1 signaling, an indicator indicating the waveform pattern may be included in the corresponding L1 signaling. Alternatively, even when the UE is not allocated the resource through the L1 signaling as in the grant-free transmission scheme, the waveform pattern may be changed through the L1 signaling when the grant-free transmission attempted by the UE is switched to the grant-base transmission by the base station. Alternatively, even if the grant-free transmission of the UE is not switched to the grant-based transmission, when the repetition transmission depending on the grant-free transmission scheme of the UE is controlled by feedback through the L1 signaling, the waveform pattern of next repetition transmission or grant-free transmission may be changed.

Method 3)

Further, the waveform pattern to be used by the UE may be determined through the cell configuration. In this case, the information (or parameter) for the cell configuration may include a parameter indicating the waveform pattern to be explicitly used by the UE. Alternatively, in the cell configuration, only a predetermined threshold may be delivered and the waveform pattern to be used by the UE may be determined based on parameters (e.g., UE capability information, temporally dynamic information, etc.) of the UE. In this case, the UE may be configured to be allocated the grant-free resource associated with each waveform pattern.

Method 4)

When the UE uses both the uplink transmission according to the grant-based transmission scheme and the uplink transmission according to the grant-free transmission scheme, the waveform pattern of the grant-free transmission scheme may be configured to use the waveform pattern of the grant-based transmission scheme. Alternatively, on the contrary, the waveform pattern determined in the grant-free transmission scheme may be similarly applied even to the grant-based transmission scheme.

In this case, when the UE supports both the grant-based transmission scheme and the grant-based transmission scheme, different waveform patterns may be configured to be used for a case of performing the uplink transmission of the grant-based transmission scheme for retransmission of the grant-free transmission scheme and a case of performing initial transmission in the grant-based transmission scheme. At this time, two transmissions may overlap each other at one slot or one time and it may be assumed that when the waveform patterns are different, the UE may not perform two transmissions simultaneously regardless of the capability thereof.

In addition, the method for changing the waveform pattern may be performed in the same method regardless of the grant-free transmission scheme or the grant-based transmission scheme.

Method 5)

In addition, the waveform pattern may be configured to semi-static, but may be configured differently depending on a scheduling unit of the UE or a monitoring period of a control resource set (CORESET).

For example, it may be assumed that SC-OFDM is used in case of mini-slot based transmission and it may be assumed that OFDM is used in case of slot-based transmission. At this time, when two channels corresponding to different waveform patterns overlap with each other, the UE may not assume simultaneous transmission in at least one carrier.

A method may also be considered in which a different power control parameter, a retransmission counter, a retransmission operation, an HARQ process, and the like are separately set and operated depending on a quality of service (QoS)/BLER target or the like when waveform types are configured differently.

When the configuration for the waveform pattern is performed simultaneously with the resource allocation like method 1 or method 2 described above, the indication for the waveform pattern may be implicitly determined according to the type of resource allocation without a separate parameter and/or information.

For example, a fact that the UE is allocated a consecutive resource(s) may mean using the DFT-s-OFDM based waveform pattern and a fact that the UE is allocated an inconsecutive resource(s) may mean using the CP-OFDM based waveform pattern. Here, the fact that the UE is allocated the inconsecutive resource(s) may mean being allocated the resource in a bitmap form.

Similarly, the waveform pattern may be determined according to the resource allocation scheme. For example, when the resource is allocated in an RA type 0 scheme, the UE may be configured to use CP-OFDM and when the resource is allocated in an RA type 2 scheme, the UE may be configured to use DFT-s-OFDM.

Alternatively, the waveform may be determined by the scheduling DCI itself. For example, when the scheduling DCI may be delivered through one of multiple formats having different bit sizes, the format of the DCI may be associated with the waveform pattern which the UE is to use.

In addition, parameters used for transmission may be set differently according to the waveform pattern used by the UE. Alternatively, even though the parameters are similarly set, ranges of values and the like may be differently set according to the waveform pattern.

However, to this end, designing the signaling for each waveform pattern may increase complexity of a UE operation and cause unnecessary decoding trials.

In consideration of such a point, the interpretation of the same value transmitted by the base station may be changed according to the following methods (hereinafter, referred to as methods 1 to 3), depending on the waveform pattern used by the UE.

Method 1)

When the waveform patterns are different, DMRS related parameters may be interpreted differently. For example, the UE may interpret the DMRS parameter of the same value as a PN sequence seed table index in the case of the CP-OFDM and may interpret the DMRS parameter of the same value as a cyclic shift and OCC table index in the case of the DFT-s-OFDM.

Method 2)

When the waveform patterns are different, RA bits may be interpreted differently without a resource allocation (RA) type indicator. For example, the UE may assume and interpret the RA bit as RA type 2 in the case of the DFT-s-OFDM without an RA type indicator field. Alternatively, even if there is the RA type indicator, a predetermined (or configured) Ra bit interpretation method may be applied while ignoring the RA type indicator.

Method 3)

The power control field may be interpreted differently when the power control method is set independently between the waveform patterns or when the power control parameters are independently set and maintained according to the Qos/BLER target.

The methods described above may be applied regardless of a type (e.g., higher layer signaling, L1 signaling, etc.) of signaling transmitted by the base station.

Fifth Embodiment—Method for Performing Group-Based Power Control Signaling

In the NR system, when the UE uses the grant-free transmission scheme for sporadic traffic, a method in which multiple UEs share one resource is considered. In this case, for the multiplexing performance, it may be important that the base station controls transmission power (Tx power) of each UE.

In the existing system (e.g., LTE system), a method is used, in which multiple UEs use a TPC group and a TPC-RNTI to control the transmission power with low control overhead. However, when considering sporadic traffic, it may be difficult to configure an appropriate TPC group with low overhead:

As an example, when a 32-bit TPC bit is allocated to four grant-free resources which may be used by 8 UEs, the number of UEs that actually perform the uplink transmission among 32 UEs may be very small. Further, when it is considered that the uplink transmission is performed immediately without a separate prior signal in the grant-free transmission, the base station may determine a candidate of the UE that is to control the transmission power after the uplink transmission of the UE.

Only when the TPC transmission is smaller than an HARQ-round trip time (HARQ-RTT), the UE may reflect the HARQ-RTT in the next repetition transmission or retransmission. As a result, a method needs to be considered, in which the base station dynamically delivers the TPC bits of the UEs requiring the transmission power control as one message and the UE that attempts transmission receives bits thereof among the delivered bits.

Specifically, a method may be considered, in which the base station indicates only a UE (e.g., a UE transmitting data in the grant-free resource) requiring M TPC transmissions through the L1 signaling in a superset (e.g., UEs configured in the grant-free resource) constituted by N UEs. In the method, the UE may or may not arbitrarily monitor the corresponding L1 signaling by a predetermined condition (for example, whether to perform data transmission).

At this time, the following methods (hereinafter, methods 1 to 6) may be considered for transmitting the TPC bits to the L1 signaling.

Method 1)

A method for transmitting a TPC command in association with the HARQ-ACK may be considered. In this case, it may be assumed that the TPC command is limited only to a UE (e.g., a UE that starts transmission) which needs to receive HARQ-ACK. In this case, at the time of transmitting the HARQ-ACK, the TPC command may be together transmitted to the UE that performs HARQ-ACK transmission. To this end, a method may be considered in which the UE assumes the number of bits for the HARQ-ACK transmission and continuously transmits the TPC command(s) for each bit. Since it may be assumed that the total number of bits is limited, the number of transmitted TPCs may be set to be smaller than the number of transmitted HARQ-ACKs.

Method 2)

A method may be considered, for transmitting the TPC bit to all UEs in the superset (e.g., N UEs configured in the grant-free resource) and allocating a predetermined value or a bit indicating a specific value to a UE(s) other than M UEs requiring the TPC transmission. For example, the bit indicating the specific value may be a bit indicating 'HOLD' or 'NO CONTROL'.

The method may mean a method for delivering information of a TPC bitmap form for all N UEs.

Method 3)

A method may be considered, for transmitting M indexes which may indicate M UEs, respectively and M TPC bits associated with the respective UEs. The method may mean a method for delivering TPC bitmap information and indexes for M respective UEs requiring the TPC transmission.

Method 4

A method may also be considered, for representing a bitmap constituted by TPCs for M UEs and indexes of M UEs in the superset. For example, a case is assumed, in which TPC bits of T1, T2, and T3 need to be transmitted to UEs corresponding to UE indexes 1, 2, and 5 in a superset constituted by 8 UEs. In this case, the base station may represent a location (that is, an index location of the UE) in the superset by using information such as [01101000] or the like and transmit the TPC bitmap constituted by [T1 T2 T3] to the UE together.

In this case, a method of using a bitmap having a size of N may be considered in order to represent the location in the superset having the size of N.

Alternatively, a method of using a bitmap having a size of N/K set by grouping the indexes in K may be considered in order to represent the location in the superset having the size of N. For example, a case is assumed, in which TPC bits of T1, T2, and T3 need to be transmitted to UEs corresponding to UE indexes 1, 2, and 5 in a superset constituted by 8 UEs. In this case, the base station may represent the location in the superset by using information such as [0110] or the like by grouping the UEs in two and transmit the TPC bitmap constituted by [X T1 T2 X X T3] to the UE together. At this time, X may be set to a predetermined value or a bit indicating a specific value (e.g., a bit indicating 'HOLD' or 'NO CONTROL').

Alternatively, a method of using values indicating a start and an end may also be considered in order to represent the location in the superset having the size of N. For example, a method may be considered, for representing the starts and the ends of indexes where M UEs are positioned by using the scheme such as RA type 2 of the existing system (e.g., LTE system) and indicating the TPC bit in the corresponding region.

Method 5)

A method may also be considered, for assuming that a TPC index is implicitly mapped with the resource configured for the UE. For example, it may be assumed that a TPC transmitted in an n-th slot (slot # n) is applied only to a UE in which the configured resource exists in an n+k-th slot (slot # n+k). In this case, each TPC index may be determined by the resource or may be set to follow a value set for each UE and/or for each resource.

Further, such a 'k' value may be set differently for each UE and/or for each resource. When the 'k' value is set differently for each UE and/or for each resource, the UE assumes that the 'k' value may be set based on the higher layer signaling. Therefore, when there is the resource in a specific slot (e.g., the l-th slot), the UE may be configured to monitor the TPC only in a slot (e.g., the l-k-th slot) to which a slot offset corresponding to 'k'.

Method 6)

When the period of the grant-free resource is short, the operation of method 5 described above may be configured so that multiple UEs simultaneously monitor the TPC. Therefore, a method in which the period in which the TPC is transmitted is set separately from the period of the resource may also be considered.

That is, the period and the offset for monitoring the TPC may be set for each UE and the index for performing each monitoring by the UE may be set for each carrier, cell, or resource. It may be assumed that a timing k at which the TPC is applied is the same as a processing time of the PUSCH transmission given by the grant.

Even in the case of type 1 or type 2 configured by secondary cell (SCell), the TPC may be transmitted and the TPC may be transmitted as a cross-carrier o self-carrier. When the method proposed in method 5 described above is applied to both two cases, the timing may follow numerology of a cell in which a type 1 or type 2 resource is configured and/or numerology of activated bandwidth part (BWP).

Further, a method may be considered, in which the UEs using the grant-free transmission scheme uses a group-common DCI considered in the NR system in order to receive the TPC bit as one message. At this time, when the UEs may receive the HARQ-ACK through the group-common DCI, the UE may simultaneously receive the HARQ-ACK and the TPC bit through one signaling.

Accordingly, the TPC bit and the HARQ-ACK may be expressed through a common UE index. Alternatively, the HARQ-ACK information may be additionally used in addition to the UE index. For example, the HARQ-ACK may be configured so that the base station transmits the TPC bit only to UEs other than ACK/DTX among UEs corresponding to the UE indexes. Even if the HARQ-ACK and the TPC bit are delivered through separate signaling, when the UE may determine the number M of UEs that attempts current transmission from the HARQ-ACK information and an index m thereof in the number of UEs, the TPC may be just delivered only by M TPC bits.

Further, when the UE simultaneously supports the uplink transmission of the grant-free transmission scheme and the uplink transmission of the grant-based transmission scheme, when various uplink transmission schemes are used, when multiple grant-free resources are allocated, and/or when multiple waveform patterns are supported, different transmission power values may be used depending on a situation. In this case, different TPC groups may be configured every different uplink transmission schemes, resources, and/or waveform patterns.

Further, when the TPC is delivered through the group common DCI, the base station may deliver an offset or target reception power to be used for open-loop power control for each resource instead of delivering an offset or an absolute value compared with a previous value with the TPC value. Alternatively, the values may be delivered for each UE. This is to adjust the parameter used for power control when effectively performing inter-UE multiplexing or the like or when the UE performs the open/loop power control in order to adjust target power of each UE.

Such a configuration (or signaling) may be transmitted through a Medium Access Control-Control Element (MAC-CE) or the like or may be transmitted in a group common DCI form. At this time, although the UE-specific RRC signaling may be used, dynamic signaling may be considered to dynamically adjust the power.

Further, in this case, when multiple UEs share a resource pool, the UEs are grouped into multiple groups to be used for setting the offset or parameter to be used by each group. In this case, the power parameter(s) for each resource pool and/or each group may need to be transmitted to be UE-group common.

Sixth Embodiment—Method for Acquiring Information Related to Multiple Resources Allocated to UE When the UE is allocated the grant-free resource from the base station, a case may be required, in which multiple grant-free resources are allocated for hopping for preventing traffic, repetition transmission, and/or collision, etc. That is, the UE may be configured multiple resources to perform the grant-free transmission from the base station.

In this case, a method may be considered, in which the UE configures the grant-free resource index in order to control each allocated grant-free resource. Here, the range of the index may be determined according to the maximum grant-free resource size which the UE may be allocated. When the base station allocates the grant-free resource to the UE, the base station may be configured to notify the index of the corresponding resource together.

The base station may use the higher layer signaling or the L1 signaling in order to activate, deactivate, modify, or release the grant-free resource allocated to the UE.

When the base station performs the operations through the higher layer signaling, the base station may modify a state of a specific index by representing the index of each resource. In particular, with respect to a message indicating activation, deactivation, modification, or release, the base station may simultaneously activate, deactivate, modify, or release multiple grant-free resources by using a specific value or bitmap representing a set (or bundle) of resource indices.

Unlike this, when the base station controls the grant-free resource configured for the UE through the L1 signaling, the following methods (hereinafter, methods 1 and 2) may be used.

Method 1)

A method for encapsulating a field indicating the resource index (that is, grant-free resource index) in the L1 signaling may be considered. For example, the field indicating the grant-free resource index may be configured in the DCI. In the case of the corresponding method, methods similar to the higher layer signaling may be used.

Method 2)

A method for differently configuring Cyclic Redundancy Check scrambling (CRC scrambling) of the L1 signaling according to the resource index may also be considered.

In this case, separate fields for multiple grant-free resources in the L1 signaling may not be required. When the grant-free resource is allocated, the base station may allocate an identifier of a form similar to an identifier used for the CRC scrambling or descrambling of the L1 signaling for the grant-based transmission scheme to the UE for each grant-free resource. That is, different RNTI values for different CRC scramblings may be set with respect to the resource indexes.

Further, the resource index may be configured to not only indicate the resource but also implicate a usage of the resource. For example, the resource index may represent that the resource of a specific index is a resource for a fall-back operation. Alternatively, according to the range of the index, it may be represented that the resource of the specific index is for other services (e.g., enhanced Mobile BroadBand (eMBB) and Ultra-Reliable and Low Latency Communication (URLLC).

Further, when the UE is allocated multiple resources in order to support hopping, HARQ identifier, or repetition transmission, an activation procedure for multiple resources may be required in the case of grant-free type 2 passing through an L1 activation procedure. Such an activation procedure may be performed like the following methods (hereinafter, referred to as methods 1 to 5).

Method 1)

A method for separately processing activation or release for each resource may be considered. When using multiple resources is required, multiple DC's may be required. Further, in order to distinguish activation or release for the same configuration, multiple DCIs need to be distinguished by using the resource index or the like. In the corresponding method, when the UE may not accurately receive the DCI (that is, in the case of missing), the network (e.g., base station) and the UE may differently interpret the resource.

Method 2

A method may also be considered, for configuring multiple resource sets to be semi-static in advance in association with the activation or release (here, each resource entry may include multiple resources) and dynamically selecting one of the configured resource sets. When the corresponding resource set indicates the resource index through the DCI, the corresponding resource set may be expressed as one thereof.

Method 3

A method for indicating multiple resources by the DCI may also be considered. This may be performed by newly designing the DCI format or reusing a multi-slot resource allocation scheme or the like.

Method 4)

When multiple resources are used to support the hopping, the multi-HARQ process, the repetition transmission, etc., the base station may configure such a resource set in the UE. Here, the multiple resources may mean multiple resource configurations for the grant-free transmission scheme and the resource set may mean a set of resource configurations for the grant-free transmission scheme. For example, in order to distinguish N HARQ processes, the resource set constituted by N grant-free resource configurations may be allocated (or mapped).

Alternatively, when the resources are configured for the UE, some resource configurations may be dependent on other primary resource configurations. In this case, when the UE activates or release one of the resource sets or receives activation or release for the primary resource configuration, the UE may be configured to activate or release all corresponding resource sets.

Method 5)

With regard to releasing the resources, a method may also be considered, for configuring all resources to be simultaneously released by using a specific bit combination or a specific field value.

Seventh Embodiment—Method for Acquiring Terminal Identifier and Scrambling-Related Information A method may also be considered, in which the base station assigns an additional UE identifier for the grant-free transmission scheme separately from the UE identifier assigned from the base station when the UE accesses the network. In general, the UE identifier assigned from the base station may be used as a seed for generating a scrambling sequence of data or may be used for receiving control information (i.e., control signaling) of the base station.

Since the UE may use the grant-free transmission scheme and the grant-based transmission scheme at the same time and may be simultaneously allocated multiple grant-free configurations, it may be considered that different control signals and data scramblings are used between the grant-free transmission and the grant-based transmission or between the grant-free transmissions. For example, as mentioned in the sixth embodiment above, a method may also be considered, for performing CRC scrambling of the control signal by allocating different UE identifiers in order to distinguish control signals of the base station between the grant-free transmission and the grant-based transmission or for multiple grant-free configurations.

Using different data scrambling sequences between different uplink transmissions may be usefully used for reducing ambiguity while the base station receives the corresponding transmission.

Specifically, when data scrambling is used in the grant-free transmission scheme, a scheme of using different data scramblings between the grant-free transmission and the grant-based transmission and a scheme of using different data scrambling for multiple grant-free configurations will be described below.

First, in the case of the scheme of using different data scrambling between the grant-free transmission and the grant-based transmission, the UE identifier for the grant-free transmission scheme allocated from the base station may be used to create different data scrambling sequences. In particular, such a method may be efficient when the base station may schedule a grant-based PUSCH on a grant-free PUSCH.

In the corresponding scheme, the grant-free transmission scheme assumes that multiple resource configurations exist or even though multiple resources exist, one scrambling sequence is used. Such a scrambling sequence may be configured to be UE-specific or resource-specific (in the case of the shared resource). A method may be considered, in which separate values are used for multiple resource pools, respectively when the scrambling sequence is configured to be resource pool-specific and multiple resource pools exist.

Next, in the case of the scheme of using different data scramblings for multiple grant-free configurations, the following methods (hereinafter, methods 1 to 5) may be considered.

Method 1)

A method of using the UE identifier as a reference and the grant-free configuration index together as a scrambling sequence generator may be considered. In this case, the UE identifier as the reference may be a UE identifier or RNTI allocated for the usage of the grant-free transmission scheme.

Method 2)

A method may be considered in which the base station configures different UE identifiers for the UE for each grant-free resource configuration. The UE identifiers configured as above may be used not only for the scrambling sequence generator but also for receiving the L1 signaling of the base station for the corresponding configuration as described in the sixth embodiment. The method may also be applied to the resource pool shared among the UEs.

Method 3)

A method may be considered in which the UE uses a value automatically determined using the number of allocated configurations or the maximum number of configurations as the scrambling sequence generator. For example, when the number of configurations allocated to the UE or the maximum of configurations which may be allocated to the UE is n, n different scrambling sequences may be used by using a result value of '(an index of used time/frequency resource) mod n' operation as the scrambling sequence generator.

Alternatively, a method of simply generating n different scrambling sequence generators by a certain function and allocating the generated scrambling sequence generators to each configuration may also be considered. In this case, a reference allocated to each configuration may be the grant-free resource index.

Further, the UE identifier may also be additionally considered in order to differentiate the scramblings between the UEs. In this case, the used UE identifier may be the UE identifier allocated for the usage of the grant-free transmission scheme. For example, when a maximum of N RNTIs are used, the scrambling sequence generator may be determined in a format of '(starting RNTI+slot index mod N) mod N' based on the resource slot index set at 'SFN=0'.

Method 4)

A method of using the information included in the grant-free configuration as the scrambling sequence generator may also be considered. For example, the time/frequency resource of the resource configuration, the RS parameter, the MCS value, etc. (e.g., a decimal representation value of the corresponding information) may be used as the scrambling sequence generator. Different configurations may automatically have different scrambling sequences by generating the scrambling sequence through the value included in such a configuration.

Further, the UE identifier may also be considered together in order to differentiate the scramblings between the UEs. In this case, the used UE identifier may be the UE identifier allocated for the usage of the grant-free transmission scheme.

Method 5)

A method of using an HARQ process ID as the scrambling sequence generator may also be considered. The corresponding method may be more useful for using different HARQ process identifiers for each grant-free configuration.

When each grant-free configuration has an independent HARQ process ID numbering, the scrambling sequence generator may be determined by additionally considering the UE ID allocated for each grant-free resource index or grant-free configuration.

Further, the UE identifier may also be considered together in order to differentiate the scramblings between the UEs. In this case, the used UE identifier may be the UE identifier allocated for the usage of the grant-free transmission scheme.

In the embodiment, a scheme of using different data scramblings between the grant-free transmission and the grant-based transmission and a scheme of using different data scramblings with respect to multiple grant-free configurations may be used in combination with each other. For example, the scheme of using different data scrambling between the grant-free transmission and the grant-based transmission and method 4) described above may be applied at the same time. Alternatively, the scheme of using different data scrambling between the grant-free transmission and the grant-based transmission and method 2) and/or method 5) described above may be applied at the same time.

Even if the UE uses only the transmission according to one grant-free resource configuration, the base station may have to distinguish each transmission of the UE.

For example, when the UE performs the repetition transmission, the base station may need to know how many repetitions the received transmission is. Alternatively, when some of the repetition transmissions may not be appropriately received (that is, in the case of missing), when the base station may not specify a transmission start position of the UE, or when retransmission of the transport block through the grant-free transmission scheme may occur, the base station may determine whether the received transport block is the same as the previous transport block.

In this case, a method for configuring different scrambling sequences according to a repetition order may be considered in order to distinguish the repetition transmission. Specifically, when the UE performs K repetition transmissions, K different scrambling sequences may be configured. Alternatively, scramblings of first repetition transmission and the remaining repetition transmissions may be differently configured. Alternatively, a method for toggling the scrambling sequence when the transport block transmitted to the base station is switched may be considered.

In addition, the base station may request retransmission of the corresponding transport block through the UL grant for the transport block (i.e., the transport block transmitted through the grant-free transmission scheme) transmitted without the grant by the UE. In this case, as described above, the UL grant may be CRC scrambled with an RNTI different from the RNTI used in the grant-based transmission scheme.

In this case, with regard to selecting a data scrambling method to be used for the retransmission, the corresponding HARQ process, or the UE identifier to be used for transmitting and receiving the L1 signaling for the corresponding transport block, the following methods (hereinafter, referred to as methods 1 and 2) may be considered.

Method 1)

A method for applying the same parameter or parameter selecting method as being used for the previous grant-free transmission to the retransmission may be considered. That is, even though the transport block that is transmitted without the grant is based on the grant, when the transport block is initially transmitted without the grant, the same 'UE identifier or UE identifier selecting method' and/or 'data scrambling sequence or data scrambling sequence selecting method as initial transmission may be configured to be applied to the retransmission of the corresponding transport block until the transmission expires.

In the method, when HARQ PID pools of the grant-free transmission and the grant-based transmission are separated or a separate HARQ process number is used, in particular, when the HARQ process is separated by CRC scrambling of the transmitted UL grant, the transmission may be continued without changing the HARQ process identifier (PID) of the transport block.

Method 2)

A method for applying the same parameter for the grant-based transmission scheme to the corresponding retransmission may be considered. That is, when the transport block that is transmitted without the grant is based on the grant, the same 'UE identifier or UE identifier selecting method' and/or 'data scrambling sequence or data scrambling sequence selecting method as general grant-based transmission may be configured to be applied.

In the corresponding method, when the HARQ PID pools of the grant-free transmission and the grant-based transmission are not separated and the same HARQ PID number is used, in particular, when the HARQ PID pool of the grant-free transmission is included in the HARQ PID pool of the grant-based transmission, the operation may be more simplified by selecting the same UE identifier and scrambling sequence as the grant-based transmission scheme.

Alternatively, even though the HARQ PID pools of two transmissions are not separated, when the HARQ process of the grant-free transmission is limited, a transport block not requiring the grant-free resource for transmission any longer may occupy the HARQ PID of the grant-free transmission. In order to prevent such a problem, the retransmission may be configured to be performed by the same method as the grant-based transmission. In this case, the PID of the corresponding transport block may be switched from the PID of the grant-free transmission to the PID of the grant-based transmission.

At this time, the following methods (methods 2-1 to 2-3) may be additionally considered when the process identifier of the TB is switched.

Method 2-1)

First, each grant-free configuration may be mapped to the HARQ PID of the determined grant-based transmission. In this case, there may be only one transport block that is switched to the grant-based transmission scheme and transmitted at the same time per grant-free configuration. It may be considered that the HARQ PID mapped to the grant-free transmission is used in the grant-based transmission for efficiency of HARQ PID management.

When the HARQ PIDs for two transmissions collide with each other, one transmission of two transmissions may be dropped or postponed by a predetermined rule. For example, when the UE receives a grant-based UL grant that indicates the same HARQ PID as the HARQ-PID being used in the grant-free transmission scheme, one of the two transmissions may be dropped or postponed.

Method 2-2)

When the UL grant may be associated with the transport block transmitted in the grant-free transmission scheme regardless of the HARQ PID field information included in the UL grant, the HARQ PID included in the UL grant may indicate the HARQ PID of the grant-based transmission to be switched. To this end, two HARQ PID fields may be configured in the UL grant.

Method 2-3)

When the grant-free transmission of the UE is switched to the grant-based transmission, the HARQ PID of the grant-free transmission may be switched to the HARQ PID of the grant-based transmission by a certain function or offset. In this case, the collision may occur between the HARQ PID switched in the grant-free transmission and the HARQ PID being used in the grant-based transmission. At this time, one of the two transmissions may be configured to be dropped or postponed by a predetermined rule.

Further, when the transport block initially transmitted without the UL grant is retransmitted through the UL grant, the UE may not receive the corresponding UL grant (i.e., when the UL grant may miss).

In general, when the UE may not receive the UL grant for second transmission (e.g., first retransmission), the base station may attempt to decode the scheduled resource. When the base station determines that the UE does not perform the second transmission or fails in decoding, the corresponding base station may be configured to transmit the UL grant for third retransmission to the UE.

At this time, when a method (i.e., method 1 described above, which is related to retransmission) for applying the same parameter or parameter selecting method as used for the previous grant-free transmission to the retransmission is applied, the same CRC scrambling is used for the UL grant for the second transmission and a third UL grant. Therefore, even if the UE may not receive the UL grant for the second transmission, the UE may receive the UL grant for the third transmission without any problem.

Unlike this, when a method (i.e., method 2 described above, which is related to retransmission) for applying the same parameter for the grant-based transmission scheme to the retransmission is applied, the UE may determine the corresponding UL grant not as the UL grant for the transport block transmitted in the grant-free transmission scheme but as the UL grant for the transport block transmitted in the grant-based transmission scheme. In this case, the UE may transmit a transport block other than the transport block indicated by the base station.

Therefore, it is necessary to consider a method for preparing for the case where the UE may not receive the UL grant for retransmission. At this time, the following methods (hereinafter, methods 1 to 3) may be considered.

Method 1)

For the grant-free transmission scheme, a method for allowing only the second transmission may be considered. That is, the UE may be configured to perform only up to the first retransmission for the grant-free transmission scheme.

Method 2)

A method may be considered in which, when the base station receives the second transmission for the grant-free transmission scheme, DTX is determined based on a preset threshold and in case of DTX, the UL grant for the third transmission is not transmitted. Alternatively, the base station may be configured to transmit the same UL grant as the UL grant for the second transmission, for the third transmission.

Method 3)

In order to distinguish the UL grants of the grant-free transmission scheme and the grant-based transmission scheme, a method may also be considered, in which the UE is configured to additionally examine validation for the DCI for the grant-free transmission by using information included in the UL Grant, in addition to CRC scrambling. When it may be determined that the DCI is not valid or when examining the validation is unsuccessful, the corresponding UE may be configured to drop the corresponding UL grant.

Eighth Embodiment—Method for Acquiring Information Related to Fall-Back Resource Even if the UE is allocated a grant-free resource from the base station, it may be impossible to use the corresponding resource depending on the situation. For example, when a dynamic TDD is used, some or all of slots of the resource allocated for uplink transmission based on grant-free transmission may be changed to a downlink resource.

Alternatively, some or all of the grant-free resources may collide with uplink resources used for other operations such as RACH resources. In this case, a method of puncturing or rate-matching the grant-free resource or a counter-part causing the collision may be considered. However, for this purpose, aligned information between the base station and the UE may be required.

In addition, a slot format indicator (SFI) used in the dynamic TDD may not be properly received by the UE, and additional signaling overhead and/or delay time may occur to transmit such information with high reliability. Also, since the traffic used in a URLLC is generally sporadic, it may not be preferable to puncture or rate-match the counter-part for such a transmission. On the other hand, there is a problem that the reliability can not be guaranteed for puncturing or rate-matching the grant-free resource.

In order to solve such a problem, a method of allocating a resource (hereinafter, a fall-back resource) to be used when a grant-free resource becomes unavailable or a collision with another resource occurs may be considered. At this time, the following methods (hereinafter, Methods 1 to 4) may be used to allocate the fall-back resource.

Method 1)

A method may be considered in which the UE includes resources to be used at the time of fall-back in the grant-free configuration. For example, the grant-free configuration may additionally include information about a number of resources that may be configured in a subset of slots (or minislots) in which the grant-free resource exists. When the UE determines that the allocated grant-free resource is unavailable, the UE may be configured to use some or all of additionally allocated resources.

Method 2)

A method of configuring a separate grant-free configuration for the UE to be used at the time of the fall-back may be considered. A plurality of such fall-back resources may be allocated. In addition, when the UE is allocated a plurality of grant-free configurations, each fall-back resource may be one-to-many mapped to a grant-free resource.

Method 3)

A method may be considered in which the resource to be used at the time of the fall-back is determined according to a predetermined rule based on the grant-free resource allocated by the UE.

For example, the fall-back resource may be configured as a resource at a position separated from a predetermined resource block index offset (RB index offset), a predetermined symbol, or a predetermined number of slots based on the allocated grant-free resource. Alternatively, the fall-back resource may also be in a combination thereof.

At this time, the base station may not always schedule another transmission to the corresponding fall-back resource, or may determine whether to utilize the corresponding fall-back resource by using transmitted SFI or system information.

Method 4)

A method in which the base station transmits configuration information on frequency resources to be used for different times to the UE may be considered. At this time, the frequency resource may be configured in a carrier unit or a bandwidth part (BWP) unit.

For example, when any carrier is configured for downlink transmission, the UE may be configured to switch the carrier to another carrier and perform a grant-free transmission. Such a method may be more efficient in a multi-carrier situation of TDD.

The resource configuration described above may be configured explicitly indicate the time information.

Alternatively, if a primary resource set is not available or the collision probability is high after the primary resource set and a secondary resource set are configured, the UE may be configured to use the secondary resource set. At this time, a plurality of secondary resource sets may be configured.

Also, with respect to the switching from the primary resource set to the secondary resource set, the switching n may be performed only when the primary resource set is dynamically unavailable, or may be semi-statically or dynamically directed by the network, and the UE may dynamically determine the corresponding switching.

Also, this operation may be applied in repetition transmission, and may also be applied to a case of using timing information at the time of determining a HARQ processes and the like. For example, since two carriers or BWPs may have different timing information (e.g., a different slot index), the corresponding timing information may be configured to follow the timing of the primary resource set.

Also, even if the UEs are configured to the same grant-free, the location of the fall-back resource described above may be configured differently according to each UE. Also, the above-described methods may be used in combination. For example, in order to solve the problem of the transmission collision between UEs using the RACH or the grant-free transmission scheme, the above-described Method 1 is used. In order to solve the problem in the dynamic TDD in which the entire slot becomes unavailable, the above-described Method 2 or Method 2 may be configured to be used.

As described above, in order to determine whether the fall-back resource is utilized, the UE needs to determine whether or not the allocated grant-free resource is valid. To this end, the UE may monitor SFI, system information, and the like.

For example, if the UE determines the validity of the grant-free resource through the SFI, the corresponding UE may assume that the grant-free resource belonging to the slot indicated by the SFI for the uplink purpose is valid.

Alternatively, the corresponding UE may assume that the grant-free resource belonging to the slot indicated by the SFI for the uplink purpose or the unknown purpose is valid. Alternatively, the corresponding UE may assume that the grant-free resource is always valid regardless of the SFI.

Which of the methods of the examples is used may be pre-configured on the system, or may be configured through L1 signaling or higher layer signaling by the base station. Also, in the case where the UE does not monitor the SFI, if there is no other information, the corresponding UE may be configured to assume that the grant-free resource is always valid regardless of the SFI.

Generally, since the grant-free resource continues to exist until being released (periodically), there may be ambiguity as to when to apply the determination by the corresponding SFI when the UE receives the SFI. In this case, a timing at which the determination by the SFI is applied may be set by the upper layer signaling of the base station. Alternatively, the determination may be configured so that the SFI is applied from the received slot or the next slot.

Also, a method may be considered in which the base station transmits offset information on when the fall-back resource is available by using a group common DCI to the UE at a specific timing.

For example, if the resource (s) configured in a n-th slot (slot # n) becomes unavailable due to the change to the downlink resource, the base station may transmit information on when the corresponding resource is available through the group common DCI in an n-k-th slot (i.e., slot # n-k) to the UE. As a specific example, if the offset is 1, this may mean that the same frequency/time/DMRS resources are available in the next slot (i.e., a n+1-th slot). When the UE receives such a configuration, the corresponding UE may assume that a new resource is generated in the n+1-th slot instead of the n-th slot. It is natural that such a method may be applied not only to a slot but also to a mini slot.

At this time, the above-described group common DCI may be configured to be generated only when the corresponding resource becomes unavailable. Similarly to the above-described TPC (i.e., the fifth embodiment), the period, offset, index, and the like for monitoring the group common DCI may be configured for each resource and/or carrier. Also, the group common DCI described above may be allocated to a plurality of resources. For example, the DCI transmitted in a period 'P' in an n-k-th slot may be configured to apply the same offset to unavailable resources from the n-th slot to an n+p-th slot.

Alternatively, the above-described offset information may be configured semi-statically instead of such dynamic DCI. That is, delay information about when each unavailable resource is available may be configured to the upper layer signaling.

Ninth Embodiment—Method for Acquiring Information Related to Control Resource Set CORESET A UE using the grant-free transmission scheme may be configured to monitor L1 signaling to receive an UL grant for configuration for the grant-free transmission, activation/deactivation, or retransmission of the grant-free transmission.

At this time, a monitoring area, that is, a control resource set CORESET may be configured differently from the CORESET for receiving the L1 signaling for the existing grant-based transmission. That is, the CORESET for receiving the UL grant may be configured differently for the grant-free transmission scheme and the grant-based transmission scheme.

Also, in the case of the grant-free transmission, other CORESETs may be used depending on the type of L1 signaling. At this time, the following methods (Methods 1 to 4) may be used for the base station to allocate the CORESET for the grant-free transmission to the UE.

Method 1)

A method of configuring to use the same CORESET as the CORESET of the grant-based transmission may be considered. If a plurality of CORESETs is configured for a grant-based transmission scheme, one CORESET may be specified by grant-free configuration.

In addition, when a plurality of DCI formats are applied to the L1 signaling for a grant-free transmission scheme, the UE may be configured to use a CORESET of the grant-based transmission scheme using the same DCI format size (i.e., the bit size of DCI format) for the grant-free transmission scheme. As each DCI is separated through CRC scrambling, when the UE may receive the DCI format of the same size separated by the DCI used for grant-free transmission scheme or grant-based transmission scheme, the corresponding method may be more useful.

Method 2)

A method of allocating a separate CORESET for grant-free transmission to a UE instead of a CORESET of grant-based transmission may be considered. In configuring the grant-free transmission, the CORESET to be used for the corresponding grant-free transmission may be configured, or all grant-free transmissions may be configured to use one same CORESET regardless of the configuration.

When the plurality of DCI formats are applied to the L1 signaling for the grant-free transmission scheme, different CORESETs may be allocated according to different DCI formats or different DCI format sizes.

Method 3)

Regardless of the grant-free transmission scheme or the grant-based transmission scheme, a method of allocating different CORESETs according to the DCI format or the DCI format size to be received by the UE may be considered.

Method 4)

With respect to L1 signaling of grant-free transmission (hereinafter, referred to as transmission A) based on only the higher layer signaling (e.g., RRC signaling), it is assumed a case where a CORESET of another grant-free transmission (hereinafter, referred to as transmission B) using L1 signaling associated with the corresponding UE is present. In this case, a method of using a CORESET configured for the transmission B as a CORESET for the transmission A may be considered.

The above-described type of L1 signaling may be distinguished by detailed contents of activation/deactivation of grant-free configuration, UL grant, and corresponding signaling. For example, in the case of the UL grant, a minislot-based scheduling UL grant and a slot-based scheduling UL grant may be distinguished as different types of L1 signaling.

Tenth Embodiment—Method for Acquiring Information Related to Reference Signal As described above, when grant-free transmission is considered, some parameters such as reference signal parameters need to be set to different values for each UE. When a plurality of UEs simultaneously use the same uplink resource, it may be difficult for the base station to recognize the UE from reference signals transmitted with different parameters.

In general, the UE may use two reference signals for uplink transmission. One of the two reference signals is used to measure a channel of a PUSCH transmitted by the UE using a demodulation reference signal (DMRS), and the other one thereof may be used to compensate for a phase such as a Doppler effect of the UE and a carrier frequency offset (CFO) using a phase-tracking reference signal (PTRS).

Each reference signal transmitted by the UE may be configured differently according to a waveform pattern used by the UE. For example, a UE using DFT-s-OFDM may use a cyclic-shifted ZC sequence and a UE using CP-OFDM may be configured to use a PN sequence as a reference signal.

Also, a method of generating a sequence for a specific reference signal may be configured differently according to the waveform pattern used by the UE for transmission. For example, the DMRS sequence may be configured or generated in different types with respect to a DFT-s-OFDM based waveform pattern (i.e., a waveform pattern with a shifted precoder available) and a CP-OFDM based waveform pattern (i.e., a waveform pattern with a shifted precoder unavailable).

On the contrary, the waveform pattern may also be configured differently according to each reference signal transmitted by the UE.

In the case where the UE uses the cyclic shifted reference signal as the DMRS, in order to multiplex different reference signals with different UEs, each UE needs to be allocated the same sequence (e.g., a base sequence) and a different cyclic shifted value. That is, for multiplexing, a method for using the same root sequence and a method for using different cyclic shifts may be considered. Hereinafter, each method will be described in detail.

First, methods (hereinafter referred to as Methods 1 to 4) for using the same root sequence for multiplexing will be described.

Method 1)

In order to allocate the same basic sequence to each other, a method of defining additional information of a higher layer and/or additional information of a lower layer may be considered. For example, information indicating the root index of the base sequence to be used for transmission of the reference signal may be included in a RRC parameter element and/or a DCI field.

Method 2)

A method of using a DMRS antenna port number to determine the basic sequence may be considered. The corresponding method may be useful when the UE using the same DMRS location always has the same DMRS antenna port number.

Method 3)

A method of using time/frequency resource allocation information to determine a basic sequence may be considered. The corresponding method may be useful for using the same basic sequence among UEs using the same PUSCH resource.

Method 4)

It is assumed that there is the same RNTI shared for grant-free transmission between UEs, or an ACK/NACK of grant-free transmission is transmitted to the group common DCI. At this time, when an RNTI for receiving the ACK/NACK or a RNTI for fall-back transmission is commonly allocated between UEs, a method of generating a basic sequence using the corresponding RNTI may be considered.

Next, methods (hereinafter, Methods 1 to 5) for using different cyclic shifts for multiplexing will be described.

Method 1)

In order to allocate different cyclic shifts to each other, a method of defining additional information of a higher layer and/or additional information of a lower layer may be considered. For example, information indicating a cyclic shift index to be applied to a sequence to be used for transmission of the reference signal may be included in a RRC parameter element and/or a DCI field.

Method 2)

It is assumed that a DMRS antenna port is transmitted as a separate parameter or field, and a different cyclic shift is used for each DMRS antenna port in the grant-based transmission scheme. In this case, for the grant-free transmission scheme, a method using the same DMRS antenna port-to-CS mapping method as the grant-based transmission scheme may be considered.

Method 3)

A method of defining (or configuring) a cyclic shift using only a value of the corresponding DMRS antenna port may be considered by defining a DMRS antenna port-to-cyclic shift mapping method different from the grant-based transmission scheme when the DMRS antenna port is transmitted to a separate parameter or field. For example, in a grant-based transmission, when the DMRS antenna port is used to determine a resource element (RE) to which the DMRS is to be transmitted, the grant-free transmission may be configured to define not only the RE to be used for the DMRS but also the cyclic shift.

Method 4)

Like the third embodiment, a method may also be considered in which a cyclic shift value is arbitrarily derived from another value uniquely allocated to each UE. For example, a UE identifier (e.g., C-RNTI or CS-RNTI) may be shifted into an arbitrary range having a size of N (e.g., mod N), and the corresponding value may be used as an index of the cyclic shift.

When a Type 1 PUSCH resource using only the RRC configuration and a Type 2 PUSCH resource using the RRC configuration and the DCI are simultaneously configured in one cell, the UE group of each configuration may be different, so a method of deriving the cyclic shift using a UE identifier (e.g., CS-RNTI) may reduce flexibility. In this case, the Type 1 PUSCH resource may use the corresponding method, and the Type 2 PUSCH may be configured to use the same method as the grant-based transmission scheme or other methods described above.

Method 5)

Also, a method of indicating a cyclic shift value to be applied to each reference signal transmission may be considered using parameters used for generating a UE-specific PN sequence.

Unlike this, when the UE uses the PN sequence as the DMRS, it is necessary to use another sequence generation value, that is, a sequence generation initial value C_init, in order to multiplex different reference signals with different UEs. In the case of the grant-based transmission scheme, separate higher layer signaling and cell identifiers are used to allocate the sequence generation initial value.

The following methods (hereinafter, Methods 1 to 3) may be used to determine the sequence generation initial value for the grant-free transmission scheme.

Method 1)

Even in the case of the grant-free transmission scheme, a method of configuring the sequence generation initial value of the grant-based transmission scheme to be used equally may be considered.

Method 2)

A method of defining additional information of a higher layer and/or additional information of a lower layer for the sequence generation initial value of the grant-free transmission scheme may be considered. For example, information indicating an initial value for the PN sequence generation used for transmission of the reference signal may be included in an RRC parameter element and/or a DCI field.

Correlation values may be set lower when the PN sequence is appropriately selected, so that the base station may allocate a PN sequence having an explicitly low correlation value to improve the probability of detecting the UE.

Method 3)

Like the third embodiment, a method may also be considered in which a sequence generation initial value is arbitrarily derived from another value uniquely allocated to each UE. For example, a UE identifier (e.g., C-RNTI or CS-RNTI) may be used instead of a DMRS scrambling identifier.

When a Type 1 PUSCH resource using only the RRC configuration and a Type 2 PUSCH resource using the RRC configuration and the DCI are simultaneously configured in one cell, the UE group of each configuration may be different, so a method of deriving the cyclic shift using a UE identifier (e.g., CS-RNTI) may reduce flexibility. In this case, the Type 1 PUSCH resource may use the corresponding method, and the Type 2 PUSCH may be configured to use the same method as the grant-based transmission scheme or other methods described above.

In addition, the base station may configure the PTRS to be transmitted when the UE performs uplink transmission through higher layer signaling. A UE configured to transmit the PTRS may transmit the PTRS by considering a PUSCH resource allocated thereto, an MCS of a transport block, and/or a resource block size (RB size).

However, considering the use of PTRS, it may be advantageous to transmit the PTRS even though the MCS is low and the resource block size is small in the URLLC transmission having a low traffic arrival rate. On the other hand, in the grant-based PUSCH configured as the contention-based transmission, even if the UE transmits the PTRS, the resource element to which the PTRS is transmitted may not be affected by the PUSCH transmission of the other UE unless another UE rate-matches or punctures the corresponding resource element.

Therefore, considering the PUSCH transmission based on the grant-free transmission scheme, the PTRS transmission may be performed through the following methods (hereinafter, Methods 1 to 5).

Method 1)

In the case of the grant-free transmission scheme, a method may be considered in which PTRS transmission is not performed regardless of other PTRS configurations, MCSs, resource block sizes, and the like. In this case, it may be assumed that the UE does not transmit the PTRS in the grant-free transmission scheme.

Method 2)

Unlike Method 1), in the case of the grant-free transmission scheme, a method may be considered in which PTRS transmission is performed regardless of other PTRS configurations, MCSs, resource block sizes, and the like.

Method 3)

A method of determining whether to transmit the PTRS in the same manner as in the grant-based transmission scheme may be considered with respect to the PTRS of the grant-free transmission scheme.

Method 4)

For PTRS transmission in the grant-free transmission scheme, a method of using a different parameter table different from the Grant-based transmission method may be considered. Alternatively, the UE may use the same parameter table and be allocated a separate threshold value for the grant-free transmission scheme.

For example, the parameter table is used for grant-free transmission and grant-based transmission. However, in the case of the grant-free transmission, ptrs-MCS1-wogrant and N_PRBn-wogrant allocated separately from ptrs-MCSn and N_PRBn may be configured to be used.

Method 5)

A method of defining additional information of a higher layer and/or additional information of a lower layer for determining whether the PTRS is transmitted in the grant-free transmission scheme may be considered. For example, information indicating whether the PTRS is transmitted may be included in a RRC parameter element and/or a DCI field.

For example, the corresponding information is a 1-bit flag indicating whether the PTRS is transmitted in the grant-free transmission. When the corresponding flag is 'ON', the UE may determine the density of the PTRS (i.e., the degree to which the PTRS is mapped to the resource region) considering the MCS and the resource block size of the PUSCH resource allocated thereto. At this time, conditions different from the grant-based transmission scheme may be used as in the above-described Method 3).

When the PTRS is transmitted from the contention-based PUSCH, if the PTRS resources used between the UEs are configured differently, the transmission of the reference signal may be interrupted by the uplink data. Therefore, it may be effective to configure the same resource element used for PTRS transmission between UEs sharing one PUSCH, and to configure a low correlation between sequences for transmitting PTRS.

At this time, the use of the parameter set to generate the basic sequence of the DMRS based on the ZC sequence may be considered as a method of configuring the same PTRS transmission location (i.e., the same PTRS transmission resource). For example, information of the time/frequency resource allocation may be used to determine the PTRS transmission location of the contention-based PUSCH.

Further, in order to generate the PTRS sequence for each UE regardless of orthogonality or correction, the existing method is used, the method of determining the UE specific DMRS is used, or the index of the set of the PN sequence that has been confirmed to have the lowest correlation may be configured to be derived through a UE-specific parameter. At this time, the UE-specific parameter to be used may be a parameter used for generating the UE-specific DMRS.

Eleventh Embodiment—Method for Determining Transport Block Size

When a UE receives a grant, a transport block size (TBS) may be calculated by a function of the number of resource elements and a code rate. In addition, the TBS may be calculated by acquiring a parameter for the overhead in consideration of a DMRS overhead (OH) by the higher layer signaling and multiplying the acquired values.

A scheme similar to those described above may also be applied to the grant-free transmission scheme, and a value for overhead may be set separately for the grant-base transmission scheme and the grant-free transmission scheme, or may also be one value (a value set for each carrier). At this time, the overhead of the DMRS and/or PTRS needs to be excluded.

In order to prevent the TBS from varying according to the parameter selected by the UE for each DMRS, in the case of the grant-free transmission scheme, information on TBS and modulation order may be configured instead of the MCS.

In addition, when the UE receives the UL grant for retransmission for grant-free transmission, the corresponding UE may be configured (or assumed) to use the TBS used for the previous grant-free transmission without calculating the TBS. This may be useful in a case where it is difficult to represent the previous TBS value, especially when code block group (CBG)-based retransmission is configured through UL grant for retransmission.

That is, when the UE has already configured the UL grant or recognizes the retransmission of the received grant, the corresponding UE may skip the TBS calculation. In other words, if the UE knows in advance which the received UL grant was associated with a configuration (e.g., grant-free configuration or grant-based configuration), or knows in advance which the corresponding retransmission corresponds to the UL grant among the received UL grants, the corresponding UE may be configured to omit the TBS calculation operation.

Through such an operation, the complexity of the operation of matching the TBS between initial transmission and retransmission may be reduced. If the UE misses the initial transmission or if the calculated TBS values for the initial transmission and retransmission are different from each other, it is assumed that the network will read (or derive) the TBS of the initial transmission or the TBS of the retransmission through blind decoding (BD). Therefore, if the TBSs of the initial transmission and the retransmission may not be matched due to resource allocation or the like, it may be assumed that the network may transmit another TBS from the UE.

Twelfth Embodiment—Method for Acquiring Information Related to Frequency Hopping In an NR system, a UE may use various transmission durations. For such a UE, the base station may schedule to use symbols in the slot through various methods.

With respect to the grant-free transmission scheme, a method of applying frequency hopping to a scheduled resource (e.g., an uplink scheduled resource) may be considered.

However, when different UEs have different hopping boundaries, it may be difficult to efficiently schedule resources to be used by a plurality of UEs.

In order to solve such a problem, the following methods (hereinafter, Methods 1 and 2) may be used.

Method 1)

If the location (or position) of the reference signal (e.g., DMRS) in the uplink resource used for uplink transmission is determined based on the slot, the hopping boundary may be determined to be a location based on the slot. That is, if a reference signal is configured according to slot-based scheduling, frequency hopping may also be configured according to slot-based scheduling.

For example, in the NR system, if the UE uses a PUSCH mapping type A, the UE may always be configured to hop and transmit the PUSCH in an eighth symbol.

Method 2)

Regardless of the location of the reference signal (e.g., DMRS) in the uplink resource used for uplink transmission, the hopping boundary may be determined to be a location based on the slot. For example, in the NR system, regardless of the PUSCH mapping type, the UE may always be configured to hop and transmit the PUSCH in the eighth symbol.

In addition, the hopping boundary for the PUSCH may be determined without a higher layer parameter (e.g., an RRC parameter) such as a PUCCH. In the case of frequency hopping for the PUCCH, hopping boundaries may be specified based on time resource allocation.

However, it may not be preferable to use the same mechanism as the PUCCH for frequency hopping on the PUSCH. In addition, when the hopping boundary for the PUSCH may be differently configured according to the time resource allocation, it may be difficult to efficiently allocate multiple PUSCHs with frequency hopping to a resource grid. In this case, since the PUSCH may occupy a larger portion of the uplink resource than the PUCCH, resource allocation of the PUSCH transmission may be more important than that of the PUCCH transmission.

Thus, it may be preferable that the hopping boundary for the PUSCH is determined based on the slot boundary for the PUSCH. For example, considering that the location of the PUSCH DMRS is determined by the slot boundary for PUSCH mapping type A, with respect to at least PUSCH mapping type A, the hopping boundary for the PUSCH (i.e., the frequency hopping boundary) may be determined by a relative location for the start of the slot.

The UE, which has received the configuration information configured through the methods proposed in the above-described embodiments, may appropriately perform the uplink transmission using the grant-free transmission scheme.

FIG. 6 illustrates a flowchart of an operation of a UE performing uplink transmission in a wireless communication system to which the method proposed in the present specification may be applied. FIG. 6 is merely for convenience of explanation and does not limit the scope of the present invention.

Referring to FIG. 6, it is assumed that the UE performs uplink transmission based on the grant-free transmission scheme configured by the methods described in the embodiments of the present invention.

In step S605, the UE may receive configuration information for performing uplink transmission without the uplink grant from the base station. Here, the configuration information indicates (or represents) configuration information for the grant-free transmission scheme, and may be received through (or via) higher layer signaling. At this time, the configuration information may be configured and transmitted through the method described in one or more embodiments proposed in this specification.

Thereafter, in step S610, the UE may transmit uplink data to the base station through at least one uplink resource configured based on the configuration information. Here, the uplink data may be transmitted through the PUSCH described above. In addition, the at least one uplink resource may correspond to the at least one grant-free resource described above.

At this time, as described above (e.g., the second embodiment), the configuration information received in step S605 may include information related to repetition transmission of the uplink data. For example, the configuration information may include information indicating a repetition number of uplink data. Here, as described above, the repetition number may be configured to be the same as slot-based repetition transmission and non-slot based repetition transmission. In addition, the configuration information may further include information on hopping related to transmission of uplink data.

In addition, as described above (e.g., the fourth embodiment), when the UE supports a plurality of waveform patterns for uplink transmission, the configuration information received in step S605 may further include information indicating a specific waveform pattern to be applied to transmission of the uplink data. For example, the specific waveform pattern may be based on either CP-OFDM or DFT-s-OFDM.

In addition, the specific waveform pattern may be determined according to a resource allocation type included in the configuration information received in step S605. For example, if the at least one uplink resource is allocated contiguously, the specific waveform pattern may correspond to the OFT-s-OFDM based waveform pattern. Unlike this, if the at least one uplink resource is allocated non-contiguously, the specific waveform pattern may correspond to the CP-OFDM based waveform pattern.

Also, as described above, a demodulation reference signal (DMRS) for transmission of uplink data may be set differently according to the plurality of waveform patterns. For example, methods of generating a DMRS sequence may be applied differently with respect to a case of using the CP-OFDM based waveform pattern and a case of using the DTF-s-OFDM based waveform pattern.

Overview of Devices to which Present Invention is Applicable

FIG. 7 illustrates a block diagram of a wireless communication device to which methods proposed in this specification may be applied.

Referring to FIG. 7, a wireless communication system includes a base station 710 and multiple UEs 710 positioned within an area of the base station 720.

The BS 710 includes a processor 711, a memory 712, and a radio frequency (RF) unit 713. The processor 711 implements a function, a process, and/or a method which are proposed in FIGS. 1 to 6 above. Layers of a radio interface protocol may be implemented by the processor 711. The memory 712 is connected with the processor 711 to store various pieces of information for driving the processor 711. The RF unit 713 is connected with the processor 711 to transmit and/or receive a radio signal.

The UE 720 includes a processor 721, a memory 722, and an RF unit 723.

The processor 721 implements a function, a process, and/or a method which are proposed in FIGS. 1 to 6 above. Layers of a radio interface protocol may be implemented by the processor 721. The memory 722 is connected with the processor 721 to store various pieces of information for driving the processor 721. The RF unit 723 is connected with the processor 721 to transmit and/or receive a radio signal.

The memories 712 and 722 may be positioned inside or outside the processors 711 and 721 and connected with the processors 711 and 721 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the base station 710 and/or the UE 720 may have a single antenna or multiple antennas.

FIG. 8 is a block diagram of a communication device according to an embodiment of the present disclosure.

Particularly, FIG. 8 is a diagram illustrating a UE shown in FIG. 7 in more detail.

Referring to FIG. 8, the UE includes a processor (or digital signal processor (DSP)) 810, an RF module (or RF unit) 835, a power management module 805, an antenna 840, a battery 855, a display 815, a keypad 820, a memory 830, a subscriber identification module (SIM) card 825 (optional), a speaker 845 and a microphone 850. The UE may include a single antenna or multiple antennas.

The processor 810 may be configured to implement the functions, procedures and/or methods proposed by the present disclosure as described in FIGS. 1 to 9. Layers of a wireless interface protocol may be implemented by the processor 810.

The memory 830 is connected to the processor 810 and stores information related to operations of the processor 810. The memory 830 may be located inside or outside the processor and may be connected to the processors through various well-known means.

A user enters instructional information, such as a telephone number, for example, by pushing the buttons of a keypad 820 or by voice activation using the microphone 850. The processor receives and processes the instructional information to perform the appropriate function, such as to dial the telephone number. Operational data may be retrieved from the SIM card 825 or the memory 830 to perform the function. Furthermore, the processor may display the instructional and operational information on the display 815 for the users reference and convenience.

The RF module 835 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 840 facilitates the transmission and reception of radio signals. Upon receiving radio signals, the RF module may forward and convert the signals to baseband frequency for processing by the processor. The processed signals may be transformed into audible or readable information outputted via the speaker 845.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

Although a scheme of performing uplink transmission in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for performing uplink transmission in ultra-reliable low latency communication (URLLC), the method performed by a user equipment and comprising:
    receiving, from a base station, first configuration information for dynamic grant-free uplink transmission, wherein the first configuration information is configured separately from second configuration information for dynamic grant-based uplink transmission to the user equipment; and
    transmitting, to the base station, uplink data via PUSCH based on the first configuration information,
    wherein the dynamic grant-free uplink transmission is semi-statically configured and the dynamic grant-based uplink transmission is dynamically configured, and
    wherein the first configuration information is received through a higher layer signaling, and comprises (i) information related to a resource for transmission of the uplink data, (ii) information related to precoding and a number of layers, (iii) information related to initialization of a demodulation reference signal (DM-RS) sequence generator, and (iv) information related to whether to transmit a phase tracking reference signal (PT-RS).

2. The method of claim 1, wherein the first configuration information further includes information related to a repetition transmission of the uplink data, and
    wherein the information related to the repetition transmission includes information for a repetition number of the uplink data.

3. The method of claim 2, wherein the repetition number is identically configured for slot based repetition transmission and non-slot based repetition transmission.

4. The method of claim 2, wherein the first configuration information further includes information for hopping related to transmission of the uplink data.

5. The method of claim 1, wherein the first configuration information further includes information for a waveform type to be applied to the dynamic grant-free uplink transmission, and
    wherein the waveform type is configured to one of Cyclic Prefix-Orthogonal Frequency Division Multiplexing (CP-OFDM) or Discrete Fourier Transform-spread-Orthogonal Frequency Division Multiplexing (DFT-s-OFDM) based on the first configuration information.

6. The method of claim 5, wherein the waveform type to be applied to the dynamic grant-free uplink transmission is configured to the user equipment further based on a resource allocation type included in the first configuration information.

7. The method of claim 6, wherein, based on the resource being allocated contiguously, the waveform type is based on the DFT-s-OFDM, and
    wherein, based on the resource being allocated non-contiguously, the waveform type is based on the CP-OFDM.

8. The method of claim 5, wherein a Demodulation Reference Signal (DMRS) for the transmission of the uplink data is differently configured for a plurality of waveform types supported by the user equipment.

9. The method of claim 1, wherein whether to transmit the PT-RS is configured in a same manner as in the dynamic grant-based uplink transmission to the user equipment, based on the information related to whether to transmit the PT-RS.

10. The method of claim 1, wherein a waveform type to be applied to the dynamic grant-free uplink transmission is identically configured for a waveform type to be applied to the dynamic grant-based uplink transmission, based on that the first configuration information does not include information related to the waveform type to be applied to the dynamic grant-free uplink transmission.

11. A user equipment configured to perform uplink transmission in ultra-reliable low latency communication (URLLC), the user equipment comprising:
    a Radio Frequency (RF) unit; and
    a processor functionally connected to the RF unit,
    wherein the processor is configured to control the user equipment to:
    receive, from a base station, first configuration information for dynamic grant-free uplink transmission, wherein the first configuration information is configured separately from second configuration information for dynamic grant-based uplink transmission to the user equipment; and
    transmit, to the base station, uplink data based on the first configuration information,
    wherein the dynamic grant-free uplink transmission is semi-statically configured and the dynamic grant-based uplink transmission is dynamically configured, and
    wherein the first configuration information is received through a higher layer signaling, and comprises (i) information related to a resource for the dynamic grant-free uplink transmission, (ii) information related to precoding and a number of layers, and (iii) information related to initialization of a reference signal sequence generator for the dynamic grant-free uplink transmission.

12. The user equipment of claim 11, wherein the information further includes information related to a repetition transmission of the uplink data, and
    wherein the information related to the repetition transmission includes information for a repetition number of the uplink data.

13. The user equipment of claim 12, wherein the first configuration information further includes information for hopping related to transmission of the uplink data.

14. The user equipment of claim 11, wherein the first configuration information further includes information for a waveform type to be applied to the dynamic grant-free uplink transmission, and
    wherein the waveform type is configured to one of Cyclic Prefix-Orthogonal Frequency Division Multiplexing (CP-OFDM) or Discrete Fourier Transform-spread-Orthogonal Frequency Division Multiplexing (DFT-s-OFDM) based on the first configuration information.

15. The user equipment of claim 14, wherein the waveform type to be applied to the dynamic grant-free uplink transmission is configured to the user equipment further based on a resource allocation type included in the first configuration information.

\* \* \* \* \*